United States Patent
Nishida et al.

(10) Patent No.: US 12,287,045 B2
(45) Date of Patent: Apr. 29, 2025

(54) MEASUREMENT METHOD FOR STEAM VALVE AND MEASUREMENT DEVICE FOR STEAM VALVE

(71) Applicant: MITSUBISHI HEAVY INDUSTRIES, LTD., Tokyo (JP)

(72) Inventors: Shingo Nishida, Tokyo (JP); Kazuo Hirota, Tokyo (JP); Fumiyuki Suzuki, Tokyo (JP); Masaki Hata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/293,080

(22) PCT Filed: Dec. 13, 2022

(86) PCT No.: PCT/JP2022/045769
§ 371 (c)(1),
(2) Date: Jan. 29, 2024

(87) PCT Pub. No.: WO2023/149090
PCT Pub. Date: Aug. 10, 2023

(65) Prior Publication Data
US 2024/0344631 A1     Oct. 17, 2024

(30) Foreign Application Priority Data
Feb. 1, 2022   (JP) ................. 2022-014366

(51) Int. Cl.
*F16K 39/02*     (2006.01)
*F01D 17/08*     (2006.01)
(Continued)

(52) U.S. Cl.
CPC ............ *F16K 39/024* (2013.01); *F01D 17/08* (2013.01); *F01D 17/145* (2013.01); *F01K 13/02* (2013.01);
(Continued)

(58) Field of Classification Search
CPC .... F02C 9/24; F02C 9/20; F16K 1/443; F16K 39/024; F16K 2200/202; F16K 37/0041;
(Continued)

(56) References Cited

U.S. PATENT DOCUMENTS

| | | | |
|---|---|---|---|
| 4,523,286 A | 6/1985 | Koga et al. |
| 5,743,133 A | 4/1998 | Watanabe |

(Continued)

FOREIGN PATENT DOCUMENTS

| | | | |
|---|---|---|---|
| JP | 58-25502 A | 2/1983 |
| JP | 8-261355 A | 10/1996 |

(Continued)

OTHER PUBLICATIONS

International Search Report dated Feb. 28, 2023, issued in counterpart International Application No. PCT/JP2022/045769, with English Translation. (4 pages).
Office Action dated Jan. 16, 2025, issued in DE Application No. 112022002448.8, with English translation. (46 pages).

*Primary Examiner* — Atif H Chaudry
(74) *Attorney, Agent, or Firm* — WHDA, LLP

(57) ABSTRACT

A measurement method for a steam valve according to at least one embodiment of the present disclosure, includes: a step of measuring acceleration of a valve stem when a slave valve is opened by driving the valve stem with an actuator from a fully closed state of a master valve and the slave valve; a step of detecting a timing at which the slave valve is fully opened, based on the measured acceleration of the valve stem; and a step of calculating an amount of movement of the valve stem from a reference position to a position where the slave valve is fully opened.

10 Claims, 15 Drawing Sheets

(51) Int. Cl.
*F01D 17/14* (2006.01)
*F01K 13/02* (2006.01)
*F02C 9/20* (2006.01)
*F02C 9/24* (2006.01)
*F16K 1/44* (2006.01)
*F16K 37/00* (2006.01)

(52) U.S. Cl.
CPC .................. *F02C 9/20* (2013.01); *F02C 9/24* (2013.01); *F16K 1/443* (2013.01); *F16K 37/0033* (2013.01); *F05D 2270/3011* (2013.01); *F05D 2270/3061* (2013.01); *F16K 2200/202* (2021.08)

(58) Field of Classification Search
CPC .... F16K 37/0083; F16K 37/003; F01K 13/02; F05D 2270/3061; F05D 2270/3011; F01D 17/145; F01D 17/10; F01D 17/08
See application file for complete search history.

(56) References Cited

U.S. PATENT DOCUMENTS

| | | | |
|---|---|---|---|
| 5,771,926 A | * | 6/1998 | Medal ..................... F16K 1/443 |
| | | | 137/554 |
| 2011/0260085 A1 | * | 10/2011 | van der Zee ....... F16K 37/0041 |
| | | | 251/129.15 |
| 2016/0313037 A1 | | 10/2016 | Takahashi |
| 2018/0335790 A1 | * | 11/2018 | Imsland .............. F16K 37/0041 |
| 2022/0082169 A1 | | 3/2022 | Nishida et al. |
| 2024/0337329 A1 | * | 10/2024 | Leiter ................. F16K 37/0058 |

FOREIGN PATENT DOCUMENTS

| | | |
|---|---|---|
| JP | 9-88911 A | 3/1997 |
| JP | 2014-70513 A | 4/2014 |
| JP | 2016-205584 A | 12/2016 |
| JP | 2017-160890 A | 9/2017 |
| WO | 2020/138307 A1 | 7/2020 |

* cited by examiner

MEASUREMENT METHOD FOR STEAM VALVE AND MEASUREMENT DEVICE FOR STEAM VALVE

TECHNICAL FIELD

The present disclosure relates to a measurement method for a steam valve and a measurement device for the steam valve.

This application claims the priority of Japanese Patent Application No. 2022-014366 filed on Feb. 1, 2022, the content of which is incorporated herein by reference.

BACKGROUND

For example, in a power generation system using a steam turbine, a steam valve is used which is configured to adjust the amount of steam, which is supplied to drive a steam turbine, according to a load change and to stop the steam supply to the steam turbine when an abnormality occurs. The steam valve typically includes a valve seat having an opening portion, a valve stem for moving a valve body disposed facing the opening portion of the valve seat in a direction toward and away from the valve seat, and a cylindrical support member for slidably supporting the valve stem (see, for example, Patent Document 1).

CITATION LIST

Patent Literature

Patent Document 1: JP2014-70513A

SUMMARY

Technical Problem

In the steam valve having such configuration, wear is caused by rotation, rattling, etc. of the valve body due to steam. However, in the steam valve of the steam turbine, a wear occurring section is often housed in a high-temperature and high-pressure vessel, which makes it difficult to measure the progress of the wear while continuing an operation of the steam turbine or without disassembling the steam valve.

In view of the above, an object of at least one embodiment of the present disclosure is to provide a measurement method for a steam valve and a measurement device for the steam valve, which are capable of relatively easily checking the progress of the wear on the steam valve.

Solution to Problem (1) A measurement method for a steam valve according at least one embodiment of the present disclosure is a measurement method for a steam valve including: a valve body that includes a steam flow path through which steam flows, and a valve seat disposed in the middle of the steam flow path and having an opening portion; a stop valve that includes a valve stem which extends in an axial direction where an axis extends and is movable back and forth in the axial direction, a slave valve disposed at a distal end of the valve stem in a distal end portion of the valve stem, and a master valve which includes a penetrating portion where a part of, the distal end portion of the valve stem, located closer to a proximal end side of the valve stem than the distal end is inserted, closes the steam flow path by being brought into contact with the valve seat, and is formed with a through hole where steam flows in when the slave valve is opened; and an actuator for driving the valve stem, the measurement method for the steam valve, including: a step of measuring acceleration of the valve stem when the slave valve is opened by driving the valve stem with the actuator from a fully closed state of the master valve and the slave valve; a step of detecting a timing at which the slave valve is fully opened, based on the measured acceleration of the valve stem; and a step of calculating an amount of movement of the valve stem from a reference position to a position where the slave valve is fully opened.

(2) A measurement device for a steam valve according at least one embodiment of the present disclosure is a measurement device for a steam valve including: a valve body that includes a steam flow path through which steam flows, and a valve seat disposed in the middle of the steam flow path and having an opening portion; a stop valve that includes a valve stem which extends in an axial direction where an axis extends and is movable back and forth in the axial direction, a slave valve disposed at a distal end of the valve stem in a distal end portion of the valve stem, and a master valve which includes a penetrating portion where a part of, the distal end portion of the valve stem, located closer to a proximal end side of the valve stem than the distal end is inserted, closes the steam flow path by being brought into contact with the valve seat, and is formed with a through hole where steam flows in when the slave valve is opened; and an actuator for driving the valve stem, the measurement device for the steam valve, including: an acceleration sensor for measuring acceleration of the valve stem; a first detection unit for detecting a timing at which the slave valve is fully opened, based on the acceleration of the valve stem measured by the acceleration sensor; and a calculation unit for calculating an amount of movement of the valve stem from a reference position to a position where the slave valve is fully opened.

Advantageous Effects

According to at least one embodiment of the present disclosure, it is possible to provide a measurement method for a steam valve and a measurement device for the steam valve, which are capable of relatively easily checking the progress of wear on a steam valve.

DETAILED DESCRIPTION

Figure 1:
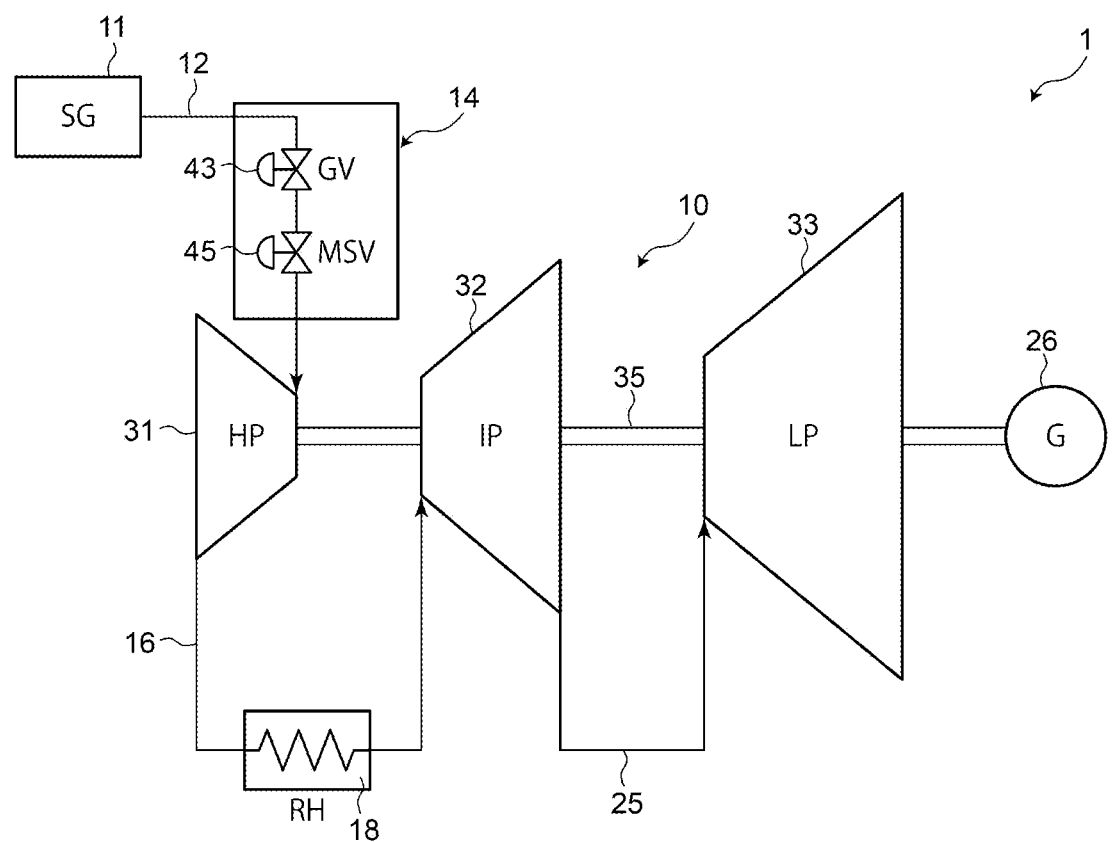
FIG. 1 is a schematic configuration diagram of a power generation system according to an embodiment.

Embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.
(Overall Configuration of Power Generation System)

A power generation system 1 using a steam valve 14 to which a measurement method for a steam valve and a measurement device for the steam valve according to at least one embodiment of the present disclosure are applied will be described. FIG. 1 is a schematic configuration diagram of the power generation system 1 according to an embodiment. The power generation system 1 includes a steam turbine 10, a boiler 11, and a generator 26.

The steam turbine 10 is a turbine driven by steam generated in the boiler 11. The steam turbine 10 is connected to the boiler 11 via a first steam supply pipe 12 and is driven by being supplied with high-pressure steam generated by burning fuel in the boiler 11. The first steam supply pipe 12 is provided with the steam valve 14 for controlling the flow rate of the steam supplied to the steam turbine 10. The steam valve 14 includes a control valve 43 and a stop valve 45, and the configuration of the steam valve 14 will be described in detail later.

In the present embodiment, a multi-stage turbine is exemplified as the steam turbine 10, and the steam turbine 10 includes a high-pressure steam turbine 31, an intermediate-pressure steam turbine 32, and a low-pressure steam turbine 33 from an upstream side with respect to a steam flow path. The high-pressure steam turbine 31 is driven by the steam supplied from the first steam supply pipe 12 (the high-pressure steam generated in the boiler 11). The steam having finished work in the high-pressure steam turbine 31 is supplied to the intermediate-pressure steam turbine 32 via a second steam supply pipe 16. The second steam supply pipe 16 is provided with a reheater 18.

The intermediate-pressure steam turbine 32 is driven by the steam supplied from the second steam supply pipe 16 (the steam having finished work in the high-pressure steam turbine 31). The steam having finished work in the intermediate-pressure steam turbine 32 is supplied to the low-pressure steam turbine 33 via a third steam supply pipe 25. The low-pressure steam turbine 33 is driven by the steam supplied from the third steam supply pipe 25 (the steam having finished work in the intermediate-pressure steam turbine 32).

The respective turbines (the high-pressure steam turbine 31, the intermediate-pressure steam turbine 32, and the low-pressure steam turbine 33) constituting the steam turbine include a common rotational shaft 35. The rotational shaft 35 is coupled to the generator 26, and the generator 26 is driven by rotating the respective turbines, thereby generating power.

Configuration of Steam Valve 14 According to First Embodiment

Figure 2:
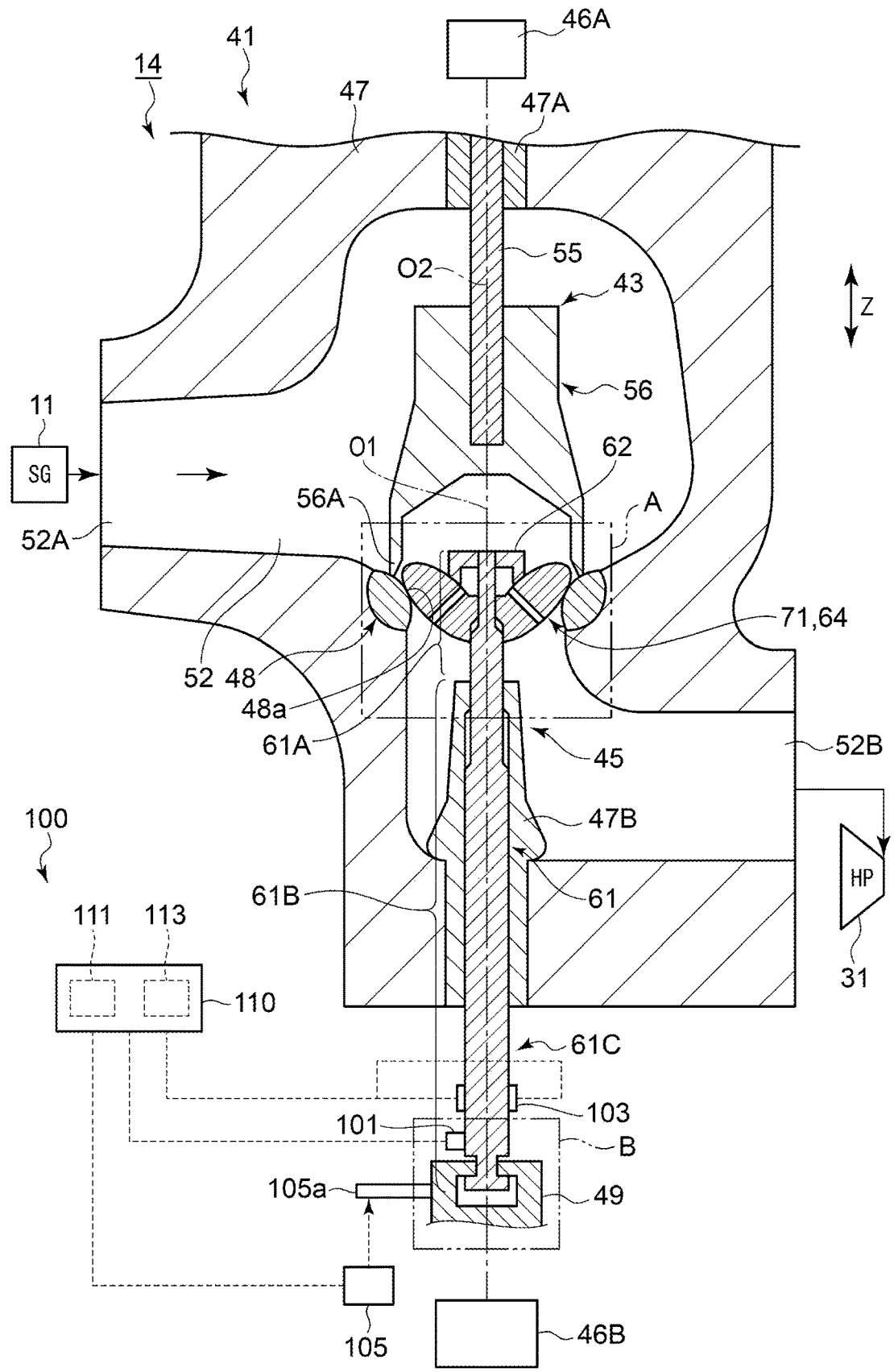
FIG. 2 is a cross-sectional view showing the configuration of a steam valve in a state where both a slave valve and a master valve are closed according to an embodiment.
Figure 3A:
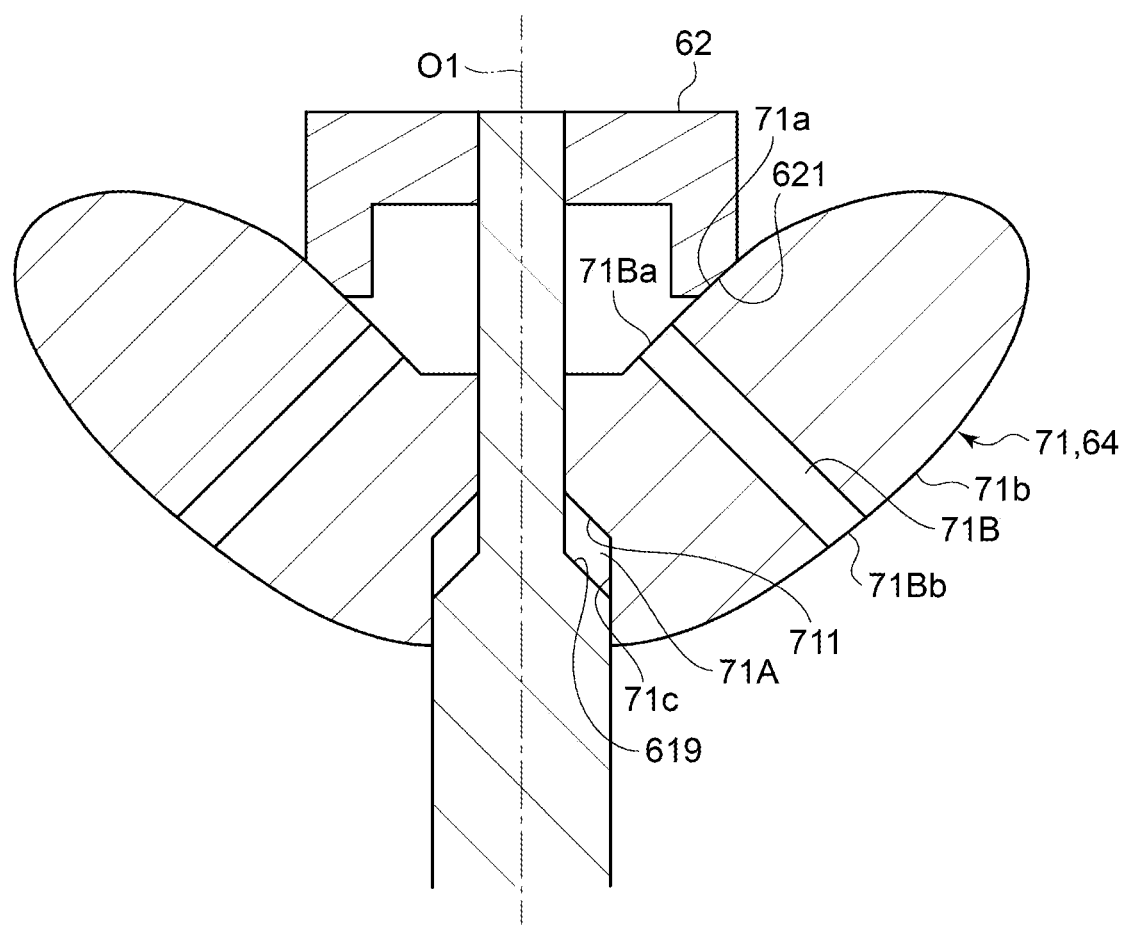
FIG. 3A is an enlarged view of a region A in FIG. 2.

Next, the configuration of the steam valve 14 according to an embodiment will be described with reference to FIGS. 2 to 4B. FIG. 2 is a cross-sectional view showing the configuration of the steam valve 14 in a state where both a slave valve 62 and a master valve 64 are closed according to an embodiment, FIG. 3A is an enlarged view of a region A in FIG. 2, and FIG. 3B is a schematic view showing a state where the slave valve 62 is first opened while the master valve 64 is in the closed state in the steam valve 14 shown in FIG. 3A.

Figure 3B:
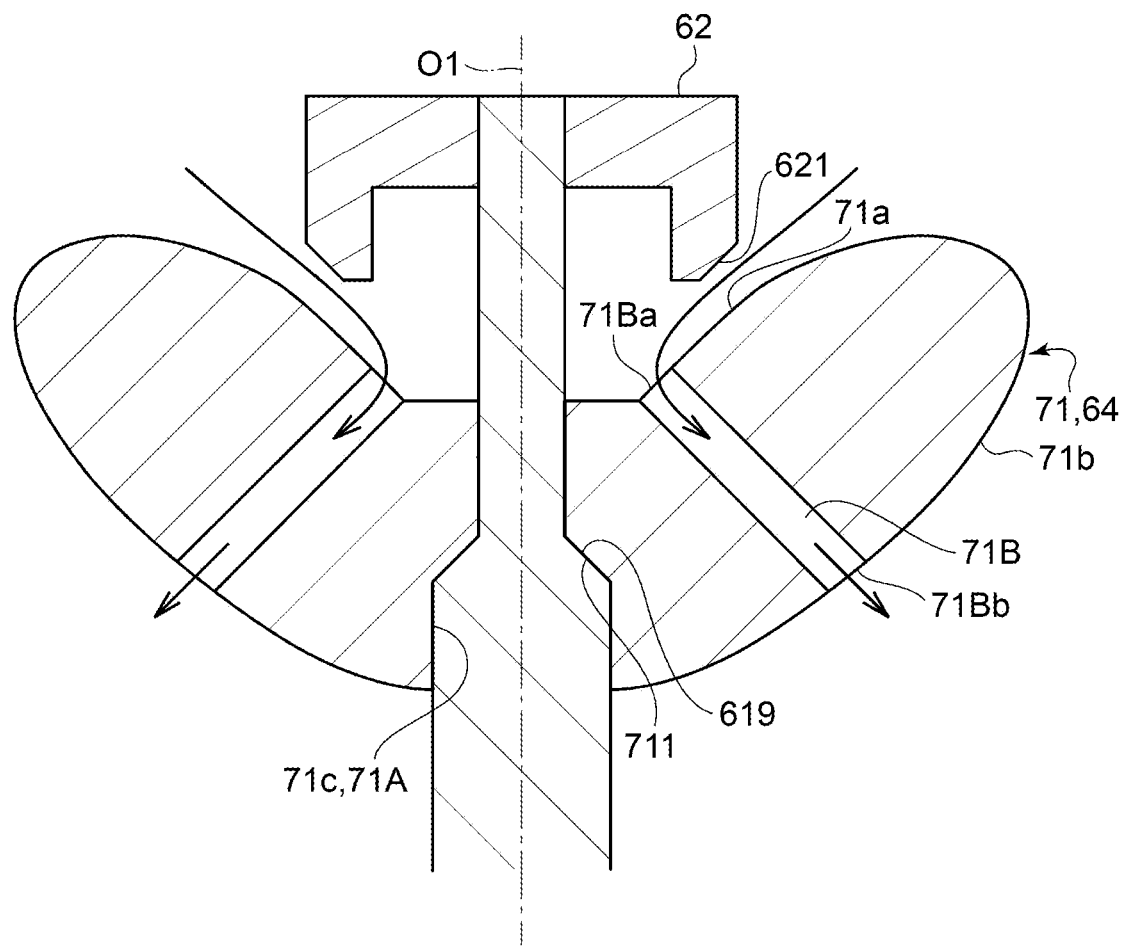
FIG. 3B is a schematic view showing a state where the slave valve is first opened while the master valve is in the closed state in the steam valve shown in FIG. 3A.

In FIGS. 2 to 3B, O1 is an axis of a valve stem 61 forming the stop valve 45, and O2 is an axis of a valve stem 55 forming the control valve 43. An extension direction of the axis O1, O2 (hereinafter referred to as an "axial direction Z") is, for example, a substantially vertical direction.

As shown in FIG. 2, the steam valve 14 according to an embodiment includes a valve body 41, the control valve 43, the stop valve 45, and actuators 46A, 46B. The valve body 41 includes a flow path dividing portion 47 and a valve seat 48. The flow path dividing portion 47 divides a steam flow path 52, and accommodates a part (distal end side) of the control valve 43 and a part (distal end side) of the stop valve 45. The steam flow path 52 has an inlet portion 52A and an outlet portion 52B. The inlet portion 52A is connected to the boiler 11 via one side of the first steam supply pipe 12, and the high-pressure steam generated in the boiler 11 is introduced. The outlet portion 52B is connected to the high-pressure steam turbine 31 via another side of the first steam supply pipe 12. The amount of the steam supplied from the boiler 11 to the high-pressure steam turbine 31 via the first steam supply pipe 12 can be adjusted by controlling the opening degree of the control valve 43 in the state where the stop valve 45 is open in the steam valve 14 disposed in the first steam supply pipe 12.

In the steam valve 14 according to an embodiment, the actuator 46A, 46B is a hydraulic actuator that can be driven by pressure oil.

The flow path dividing portion 47 includes a first guide member 47A and a second guide member 47B. The first guide member 47A is disposed so as to cover an outer peripheral surface of a portion, of the valve stem 55 forming the control valve 43, which is not exposed to the steam flow path 52. The first guide member 47A functions as a guide for guiding the valve stem 55 in the axial direction Z. The second guide member 47B is disposed so as to cover an outer peripheral surface of a rod-shaped portion 61B forming the stop valve 45. The second guide member 47B functions as a guide for guiding the valve stem 61 in the axial direction Z.

The valve seat 48 is disposed in the flow path dividing portion 47 located in the middle of the steam flow path 52. The valve seat 48 has a ring shape centered on the axis O1, and is configured such that the axis of the valve seat 48 coincides with the axis O1. The valve seat 48 has a valve seat surface 48a exposed to the steam flow path 52. The valve seat surface 48a is, for example, a curved surface. The master valve 64 forming the stop valve 45 and a distal end 56A of a control valve body 56 forming the control valve 43 can contact the valve seat surface 48a.

(Control Valve 43)

The control valve 43 is disposed upstream of a position where the stop valve 45 is disposed, in a steam flow direction. The control valve 43 includes the valve stem 55 and the control valve body 56. The valve stem 55 extends in the axial direction Z, and a distal end side of the valve stem 55 is disposed in the steam flow path 52. The axis O1 of the valve stem 55 is configured to coincide with the axis O2 of the valve stem 55 of the stop valve 45. The valve stem 55 is movable in the axial direction Z.

The control valve body 56 is disposed on the distal end side of the valve stem 55. A portion of the control valve body 56 located on the valve seat 48 side has a cylindrical shape and has the distal end 56A that can contact the valve seat surface 48a of the valve seat 48. The control valve 43 having such configuration controls an interval between the valve seat 48 and the distal end 56A of the control valve body 56 by moving the valve stem 55 along the axial direction Z with the actuator 46A, thereby having a function of controlling, according to a load of the steam turbine 10, the flow rate of high-pressure steam supplied to the high-pressure steam turbine 31.

(Stop Valve 45)

The stop valve 45 is disposed on an inner side the control valve 43. The stop valve 45 includes the valve stem 61, the slave valve 62, and the master valve 64.

The valve stem 61 extends in the axial direction Z, and has a distal end portion 61A and a rod-shaped portion 61B. The distal end portion 61A has a shape that can be engaged with the slave valve 62, for fixing the slave valve 62. The rod-shaped portion 61B extends along the axial direction Z. The rod-shaped portion 61B has a proximal end portion connected to the actuator 46B via an actuator crosshead 49. Thus, the valve stem 61 having the distal end portion 61A and the rod-shaped portion 61B is integrally formed, and is movable back and forth in the axial direction Z.

As shown in FIG. 3A, the slave valve 62 has a contact portion 621. In the steam valve 14 according to an embodiment, the slave valve 62 is fixed to the distal end portion 61A of the valve stem 61.

The contact portion 621 constitutes an outer peripheral portion of the slave valve 62. The contact portion 621 extends obliquely downward and formed into a ring shape when viewed from the axial direction Z. In a state where the slave valve 62 is closed (the state shown in FIGS. 2 and 3A), the contact portion 621 is brought into contact with a valve seat surface 71a which is formed in a master valve body 71 constituting the master valve 64. In this state, since a state is entered where an inlet 71Ba of a through hole 71B is separated from the steam flow path 52 through which high-pressure steam flows, no high-pressure steam flows through the through hole 71B.

In the steam valve 14, the stop valve 45 is opened before the control valve 43 is opened when the flow rate of steam is controlled by the control valve 43. At this time, in the stop valve 45, the slave valve 62 is opened ahead of the master valve 64 (the master valve 64 remains closed) as shown in FIG. 3B from the state where both the slave valve 62 and the master valve 64 are closed as shown in FIGS. 2 and 3A. At this time, since the contact portion 621 of the slave valve 62 is separated from the valve seat surface 71a and whereby a gap is formed between the slave valve 62 and the master valve 64, high-pressure steam flows into the inlet 71Ba of the through hole 71B. The high-pressure steam having flowed into the inlet 71Ba of the through hole 71B is led out to the steam flow path 52 from an outlet 71Bb of the through hole 71B. Consequently, a differential pressure between upstream and downstream sides of the master valve 64 is reduced, facilitating a subsequent opening operation of the master valve 64.

The master valve 64 is disposed between the slave valve 62 and the rod-shaped portion 61B, while being inserted in the valve stem 61. The master valve 64 has the master valve body 71. The master valve body 71 has a substantially V shape in a vertical cross-sectional view. The master valve body 71 includes a penetrating portion 71A, the valve seat surface 71a, a contact surface 71b, and the plurality of through holes 71B.

The penetrating portion 71A is formed so as to penetrate a central portion of the master valve body 71 in the axial direction Z. The penetrating portion 71A is, for example, a columnar hole and is defined by an inner peripheral surface 71c. The distal end portion 61A of the valve stem 61 is inserted through the penetrating portion 71A. A bush (not shown) may be disposed in the penetrating portion 71A.

The inner peripheral surface 71c is in contact with an outer peripheral surface of the valve stem 61 in a state where the distal end portion 61A of the valve stem 61 is movable in the axial direction Z.

The valve stem 61 has a valve stem inclined surface 619 which expands an outer diameter of the valve stem 61 from the distal end side toward a proximal end side of the valve stem 61, in a region where the outer peripheral surface is covered with the inner peripheral surface 71c of the master valve body 71. The valve stem inclined surface 619 is a conical inclined surface.

The master valve body 71 has a contact surface 711 that can contact the valve stem inclined surface 619 of the valve stem 61, as shown in FIG. 3B. The contact surface 711 is a conical surface formed so as to expand an inner diameter of the contact surface 711 from the distal end side toward the proximal end side.

The valve seat surface 71a is a curved surface disposed on the slave valve 62 side (the distal end side of the valve stem 61). The contact portion 621 of the slave valve 62 is brought into contact with a surface, of the valve seat surface 71a, which is located on a radially outer side centered on the axis O1 of the valve stem 60 relative to the inlets 71Ba of the plurality of through holes 71B, when the slave valve 62 is closed (see FIGS. 2 and 3A).

The contact surface 71b is a curved surface disposed on the proximal end side of the valve stem 61. An outer peripheral portion of the contact surface 71b is brought into contact with the valve seat surface 48a of the valve seat 48 in a state where the master valve 64 is fully closed. In this state, no high-pressure steam flows downstream of the valve seat 48. On the other hand, in a state where the master valve 64 is open, since the contact surface 71b and the valve seat surface 48a are separated from each other and a gap is formed between the contact surface 71b and the valve seat surface 48a, high-pressure steam corresponding to the opening degree of the control valve 43 flows downstream of the valve seat 48.

The plurality of through holes 71B are formed to penetrate the master valve body 71 so as to reach the contact surface 71b from the valve seat surface 71a. The plurality of through holes 71B are disposed in the circumferential direction of the master valve body 71. Each of the through holes 71B has the inlet 71Ba and the outlet 71Bb. The inlet 71Ba is formed in the valve seat surface 71a which is located on a radially inner side centered on the axis O1 of the valve stem 60 relative to the contact position between the contact portion 62B and the valve seat surface 71a. If the slave valve 62 opens prior to the master valve 64 as shown in FIG. 3B and a gap is formed between the slave valve 62 and the master valve 64, high-pressure steam flows into the through hole 71B via the inlet 71Ba.

The outlet 71Bb is formed in the contact surface 71b which is located on the radially outer side of the axis O1 relative to the formation position of the inlet 71Ba. The outlet 71Bb communicates with the steam flow path 52 located downstream of the valve seat 48. The through hole 71B of the present embodiment is inclined in the direction from the inlet 71Ba toward the outlet 71Bb.

(Regarding Operation of Stop Valve 45 of Steam Valve 14)

In the steam valve 14 according to an embodiment, the stop valve 45 operates as follows.

In the steam valve 14, the stop valve 45 is opened before the control valve 43 is opened when the flow rate of steam is controlled by the control valve 43.

(When Fully Closed)

When the stop valve 45 is fully closed as shown in FIGS. 2 and 3A, the valve stem 61 is biased toward the proximal end side by a biasing force of a closing spring (not shown). Therefore, the contact portion 621 of the slave valve 62 fixed to the valve stem 61 presses the valve seat surface 71a toward the proximal end side. Consequently, the master valve 64 is in a state of being interposed between the contact portion 621 of the slave valve 62 and the valve seat surface 48a of the valve seat 48. Thus, when the stop valve 45 is fully closed, the master valve 64 and the slave valve 62 are in the closed state.

In the state where the slave valve is closed, since the state is entered where the inlet 71Ba of the through hole 71B is separated from the steam flow path 52 through which high-pressure steam flows as described above, no high-pressure steam flows through the through hole 71B.

When the stop valve 45 is fully closed as shown in FIG. 3A, the valve stem inclined surface 619 of the valve stem 61 and the contact surface 711 of the master valve body 71 are separated from each other in the axial direction Z.

(Case where Stop Valve 45 Starts to Open from Fully Closed State)

In the state where the valve stem 61 starts to be driven toward the distal end side by the actuator 46B from the fully closed state of the stop valve 45 shown in FIGS. 2 and 3A, the valve seat surface 71a of the master valve body 71 and the contact portion 621 of the slave valve 62 are separated from each other as shown in FIG. 3B while the master valve 64 remains closed. Consequently, high-pressure steam flows into the inlet 71Ba of the through hole 71B from the gap between the valve seat surface 71a and the contact portion 621. As described above, the high-pressure steam having flowed into the inlet 71Ba of the through hole 71B is led out to the steam flow path 52 from the outlet 71Bb of the through hole 71B. Consequently, a differential pressure between upstream and downstream sides of the master valve 64 is reduced, facilitating a subsequent opening operation of the master valve 64.

(From Start of Opening to Fully Open State of Stop Valve 45)

If the valve stem 61 is further driven toward the distal end side by the actuator 46B from the state where the stop valve 45 starts to open described above, the valve stem inclined surface 619 of the valve stem 61 and the contact surface 711 of the master valve body 71 contact each other as shown in FIG. 3B. Consequently, if the valve stem 61 is further driven toward the distal end side by the actuator 46B, the master valve body 71 moves to the distal end side and is separated from the valve seat surface 48a of the valve seat 48.

If the second valve stem 162 is further driven toward the distal end side by the actuator 46B, the stop valve 45 enters a fully open state.

(During Closing Operation)

When the stop valve 45 is closed, if the valve stem 61 is driven toward the proximal end side by the actuator 46B, the master valve 64 and the slave valve 62 move toward the proximal end side together with the valve stem 61.

Then, the master valve body 71 contacts the valve seat surface 48a of the valve seat 48, thereby closing the master valve 64.

By driving the valve stem 61 toward the proximal end side with the actuator 46B even after the master valve 64 is closed, the valve stem inclined surface 619 of the valve stem 61 and the contact surface 711 of the master valve body 71 are separated from each other. Then, the valve seat surface 71a of the master valve body 71 and the contact portion 621 of the slave valve 62 contact each other as shown in FIG. 3A, thereby closing the slave valve 62.

The steam valve 14 to which the measurement method for the steam valve according to some embodiments described later is applied includes the valve body 41, the stop valve 45, and the actuator 46B for driving the valve stem 61, as described above. The valve body 41 includes the steam flow path 52 through which steam flows, and the valve seat 48 disposed in the middle of the steam flow path 52 and having the opening portion. The stop valve 45 includes: the valve stem 61 that extends in the axial direction Z in which the axis O1, O2 extends and is movable back and forth in the axial direction Z; the slave valve 62 disposed at the distal end of the valve stem 61 in the distal end portion 61A of the valve stem 61; and the master valve 64 that includes the penetrating portion 71A into which a part, of the distal end portion 61A of the valve stem 61, located closer to the proximal end side of the valve stem 61 than the distal end is inserted, closes the steam flow path 52 by being brought into contact with the valve seat 48, and is formed with the through hole 71B into which steam flows when the slave valve 62 is opened.

(Regarding Wear on Steam Valve 14)

In the steam valve 14 of an embodiment, for example, in the stop valve 45, the valve stem inclined surface 619 of the valve stem 61 and the contact surface 711 of the master valve body 71 repeatedly contact with and separate from each other each time the stop valve 45 is opened and closed. Consequently, as the number of times the stop valve 45 is opened and closed increases, wear between the valve stem inclined surface 619 of the valve stem 61 and the contact surface 711 of the master valve body 71 progresses.

However, for example, since the valve stem inclined surface 619 of the valve stem 61 and the contact surface 711 of the master valve body 71 are housed inside the valve casing (valve body 41) which is the high-pressure vessel, conventionally it is impossible to grasp the progress of the wear unless the steam turbine 10 is stopped and the steam valve 14 is disassembled.

Herein, for example, if the above-described wear between the valve stem inclined surface 619 of the valve stem 61 and the contact surface 711 of the master valve body 71 progresses, a distance in the axial direction Z between the valve stem inclined surface 619 of the valve stem 61 and the contact surface 711 of the master valve body 71 when the stop valve is fully closed increases. Consequently, if the wear between the valve stem inclined surface 619 of the valve stem 61 and the contact surface 711 of the master valve body 71 progresses, the amount of movement of the valve stem 61 from when the stop valve 45 is fully closed as shown in FIG. 3A to when the valve stem inclined surface 619 of the valve stem 61 and the contact surface 711 of the master valve body 71 contact each other and the slave valve 62 is fully opened as shown in FIG. 3 B increases.

Therefore, in the measurement method for the steam valve according to some embodiments, the wear on the steam valve 14 is grasped by calculating as follows the amount of movement of the valve stem 61 from a reference position of the valve stem 61 to a position where the slave valve 62 is fully opened.

First Embodiment

FIG. 2 shows a device configuration for implementing the measurement method for the steam valve according to the first embodiment.

That is, a measurement device 100 for the steam valve according to the first embodiment includes an acceleration sensor 101, a strain sensor 103, a displacement meter 105, and a controller 110.

The acceleration sensor 101 is an acceleration sensor for measuring acceleration of the valve stem 61. The acceleration sensor 101 is attached, for example, to a proximal end portion 61C of the valve stem 61 protruding outward from the valve casing (valve body 41).

The strain sensor 103 is a strain gauge for measuring the strain on the valve stem 61, for example. The strain sensor 103 is attached to the proximal end portion 61C of the valve stem 61, for example.

The displacement meter 105 is a displacement sensor for measuring the amount of movement (displacement) of the valve stem 61. The displacement meter 105 is disposed outside the valve casing (valve body 41), and is configured to measure a distance to a displacement meter target 105a attached to the proximal end portion 61C of the valve stem 61, for example.

The controller 110 includes a processor 111 for executing various types of arithmetic processing, and a memory 113 for non-temporarily or temporarily storing various data processed by the processor 111. The processor 111 is implemented by CPU, GPU, MPU, DSP, various kinds of computation devices other than these, a combination of these, or the like. The memory 113 is implemented by ROM, RAM, flash memory, a combination of these, or the like.

Figure 4:
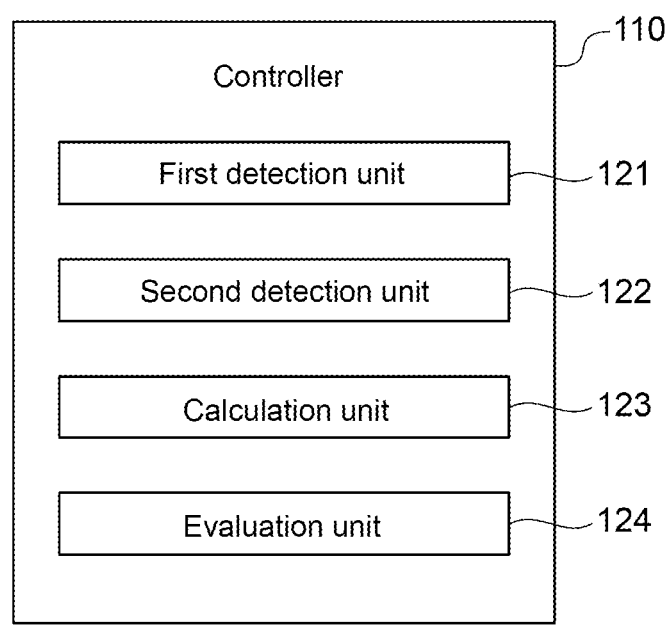
FIG. 4 is a functional block diagram of a controller according to some embodiments.

FIG. 4 is a functional block diagram of the controller 110 according to some embodiments.

The controller 110 according to some embodiments includes a first detection unit 121, a second detection unit 122, a calculation unit 123, and an evaluation unit 124, as functional blocks. These functional blocks are implemented by the processor 111 executing the programs stored in the memory 113.

Figure 5:
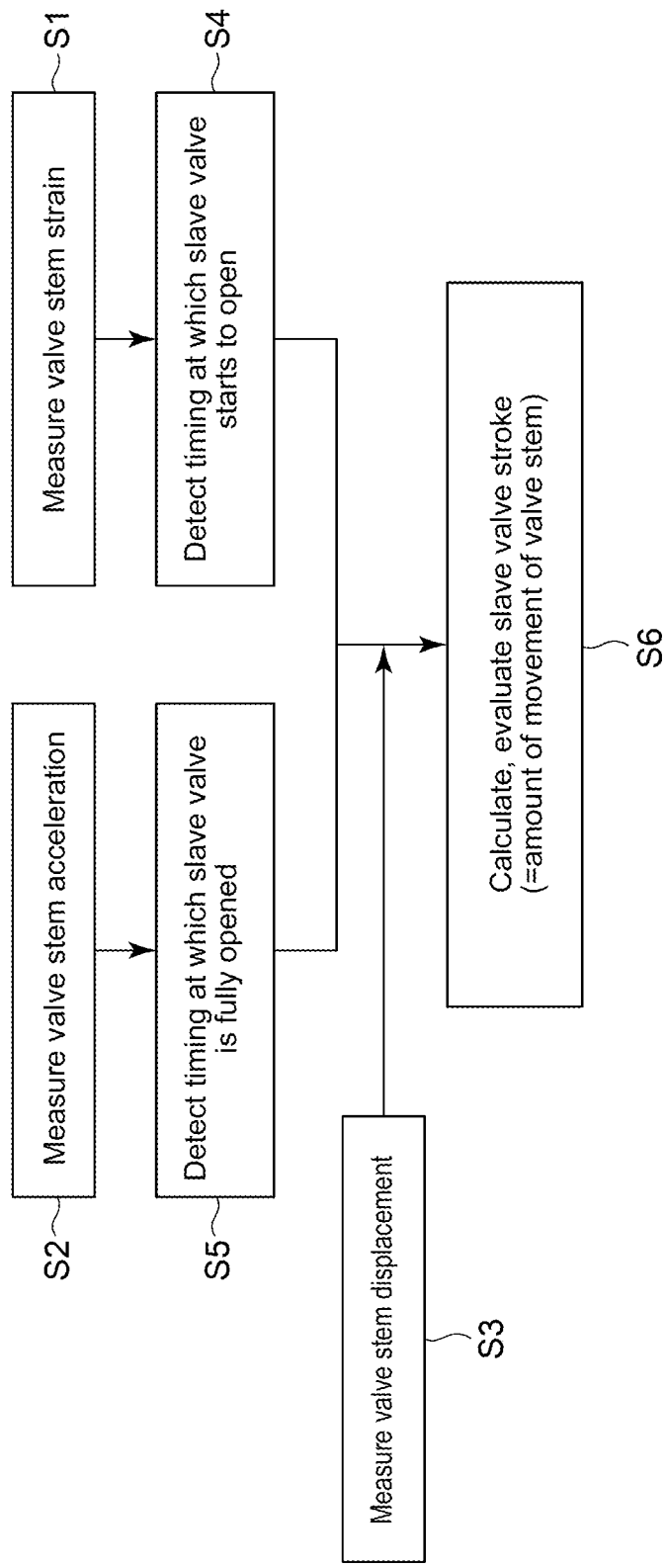
FIG. 5 is a flowchart showing a processing procedure in a measurement method for the steam valve according to the first embodiment.

FIG. 5 is a flowchart showing a processing procedure in the measurement method for the steam valve according to the first embodiment. The process shown in FIG. 5 is implemented by the processor 111 executing the programs stored in the memory 113.

In the measurement method for the steam valve according to the first embodiment, the reference position of the valve stem 61 is a position of the valve stem 61 at the beginning of opening of the slave valve 62, where the contact portion 621 of the slave valve 62 and the valve seat surface 48a of the valve seat 48 start to separate when the slave valve 62 is opened.

In the measurement method for the steam valve according to the first embodiment, a timing at which the slave valve 62 starts to open is detected from a measurement result of the strain on the valve stem 61.

In the measurement method for the steam valve according to the first embodiment, a timing at which the slave valve 62 is fully opened is detected from a measurement result of the acceleration of the valve stem 61.

In the measurement method for the steam valve according to the first embodiment, the amount of movement of the valve stem 61 is measured by the displacement meter 105.

The controller 110 starts the measurement of valve stem strain by the strain sensor 103 (step S1) and starts the measurement of valve stem acceleration by the acceleration sensor 101 (step S2).

Further, the controller 110 starts the measurement of the distance to the displacement meter target 105a, that is, the amount of movement of the valve stem 61 by the displacement meter 105 (step S3).

Figure 6:
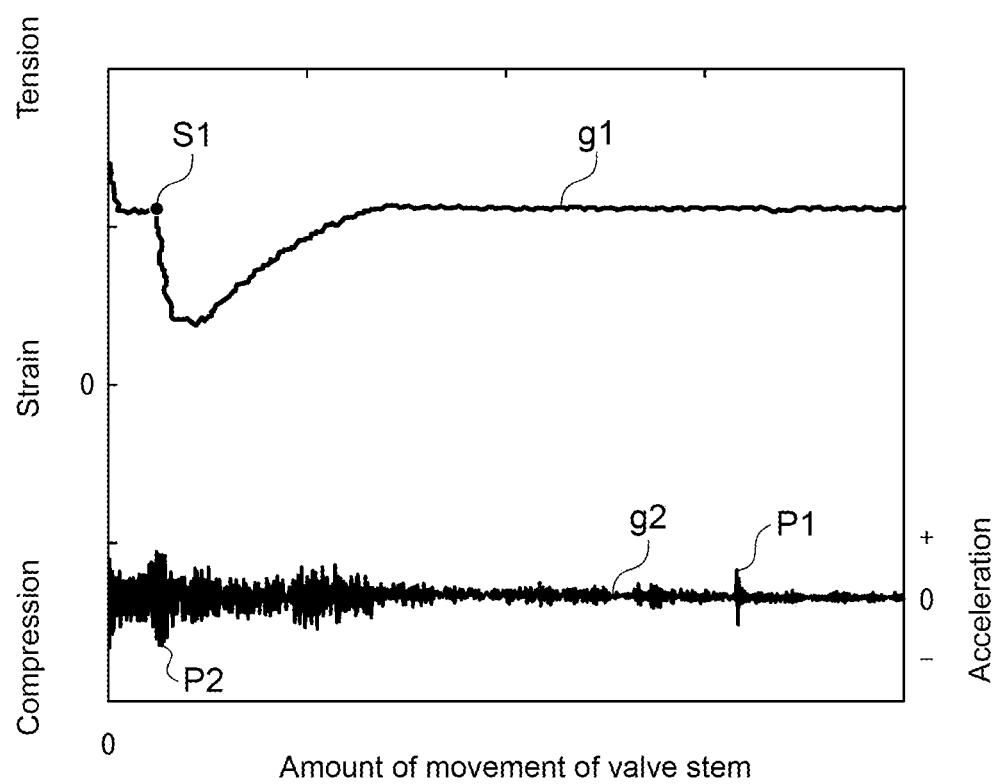
FIG. 6 is a graph showing a measurement result of valve stem strain by a strain sensor and a measurement result of valve stem acceleration by an acceleration sensor, where the horizontal axis represents the amount of movement of a valve stem.

FIG. 6 is a graph showing the measurement result of valve stem strain by the strain sensor 103 and the measurement result of valve stem acceleration by the acceleration sensor 101, where the horizontal axis represents the amount of movement of the valve stem 61.

The second detection unit 122 of the controller 110 detects the timing at which the slave valve 62 starts to open, based on the measurement result of the valve stem strain by the displacement meter 105 (step S4).

Immediately before the slave valve 62 starts to open, the slave valve 62 is to be opened against the pressure of the high-pressure steam acting on the slave valve 62, and thus a relatively large compressive force acts on the valve stem 61. Consequently, a relatively large compressive strain is generated on the valve stem 61.

When the slave valve 62 starts to open, the high-pressure steam flows into the inlet 71Ba of the through hole 71B from the gap between the valve seat surface 71a and the contact portion 621 and is led out to the steam flow path 52 from the outlet 71Bb of the through hole 71B as described above, decreasing the pressure of the steam acting on the slave valve 62. Consequently, the compressive strain on the valve stem 61 gradually decreases.

Therefore, on a graph line g1 representing the strain on the valve stem 61 in FIG. 6, a point S1 where the compressive strain on the valve stem 61 suddenly starts to decrease is the beginning of opening of the slave valve 62.

The first detection unit 121 of the controller 110 detects the timing at which the slave valve 62 is fully opened, based on the measurement result of the valve stem acceleration by the acceleration sensor 101 (step S5).

At the timing when the slave valve 62 is fully opened, as described above, the valve stem inclined surface 619 of the valve stem 61 and the contact surface 711 of the master valve body 71 contact each other as shown in FIG. 3B. Therefore, a relatively clear peak P1 appears on a graph line g2 representing the acceleration of the valve stem 61 in FIG. 6. A point where this peak P1 appears is a point where the slave valve 62 is fully opened.

The calculation unit 123 of the controller 110 calculates a difference between a stroke amount (position) of the valve stem 61, which corresponds to the point S1 on the graph line g1 representing the strain on the valve stem 61 in FIG. 6, and a stroke amount (position) of the valve stem 61, which corresponds to the peak P1 on the graph line g2 representing the acceleration of the valve stem 61 in FIG. 6, as the amount of movement of the valve stem (slave valve stroke) from the reference position (the position where the slave valve 62 starts to open) to the position where the slave valve 62 is fully opened.

Figure 7:
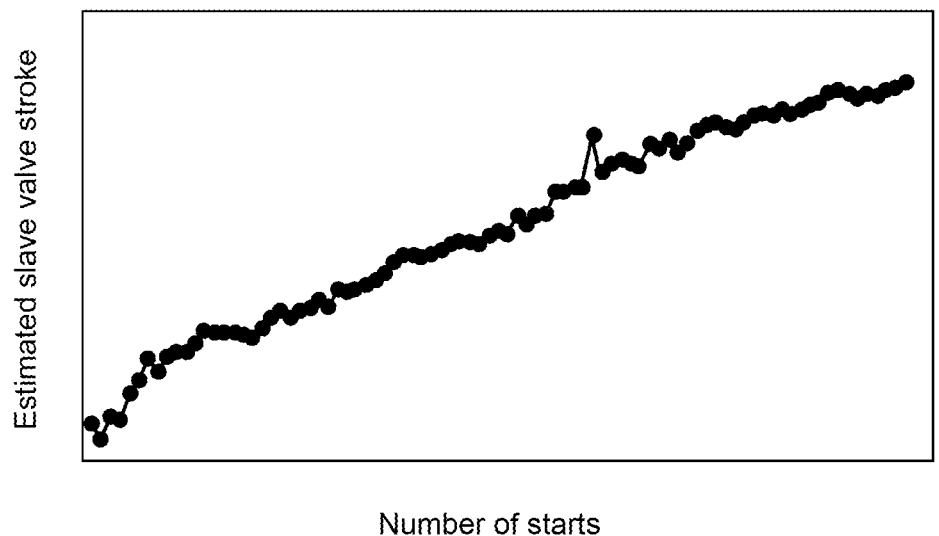
FIG. 7 is a graph showing an example of transition of an estimated slave valve stroke.

FIG. 7 is an example showing how the slave valve stroke (estimated slave valve stroke) calculated as described above changes each time the steam turbine 10 is started. As shown in FIG. 7, the estimated slave valve stroke gradually increases each time the steam turbine 10 is started.

The evaluation unit 124 of the controller 110 evaluates the amount of wear on the steam valve 14 from the estimated slave valve stroke. Specifically, for example, the evaluation unit 124 may determine whether the estimated slave valve stroke exceeds a predetermined threshold, and if it is determined that the estimated slave valve stroke exceeds the threshold, output a notification signal for notifying the outside that the estimated slave valve stroke exceeds the threshold.

Second Embodiment

Figure 8:
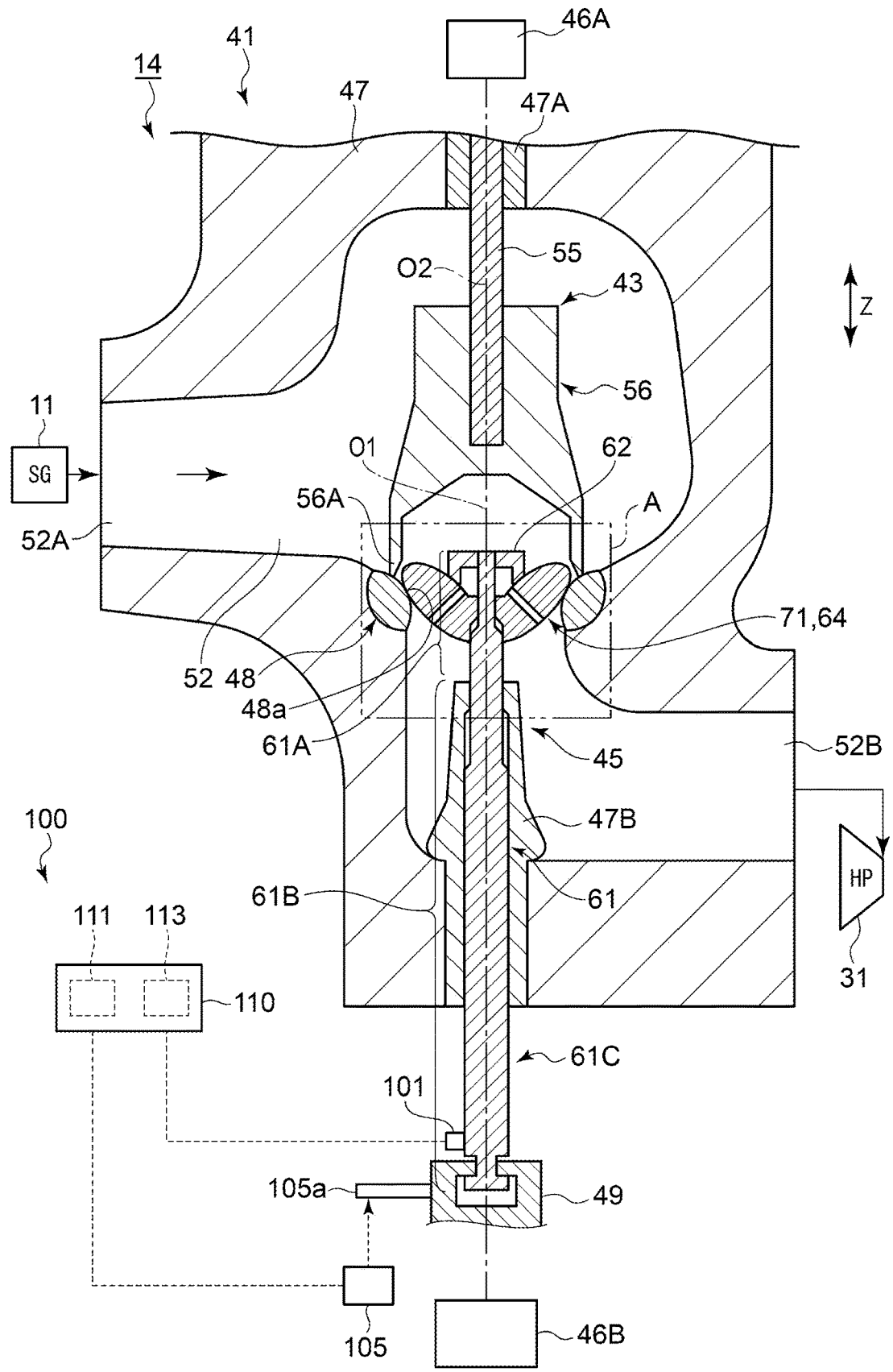
FIG. 8 is a diagram showing a device configuration for implementing the measurement method for the steam valve according to the second embodiment.

FIG. 8 is a diagram showing a device configuration for implementing the measurement method for the steam valve according to the second embodiment.

The measurement device 100 for the steam valve according to the second embodiment includes the acceleration sensor 101, the displacement meter 105, and the controller 110.

In the following description, the same components as those of the measurement device 100 for the steam valve according to the first embodiment are given the same reference signs as those of the measurement device 100 for the steam valve according to the first embodiment, and detailed descriptions thereof may be omitted.

In the measurement method for the steam valve according to the second embodiment, the reference position of the valve stem 61 is the position of the valve stem 61 at the beginning of opening of the slave valve 62, where the contact portion 621 of the slave valve 62 and the valve seat surface 48a of the valve seat 48 start to separate when the slave valve 62 is opened.

In the measurement method for the steam valve according to the second embodiment, the timing at which the slave valve 62 starts to open is detected not from the measurement result of the strain on the valve stem 61 but from the measurement result of the acceleration of the valve stem 61.

In the measurement method for the steam valve according to the second embodiment, the timing at which the slave valve 62 is fully opened is detected from the measurement result of the acceleration of the valve stem 61, as in the first embodiment.

In the measurement method for the steam valve according to the first embodiment, the amount of movement of the valve stem 61 is measured by the displacement meter 105, as in the first embodiment.

Figure 9:
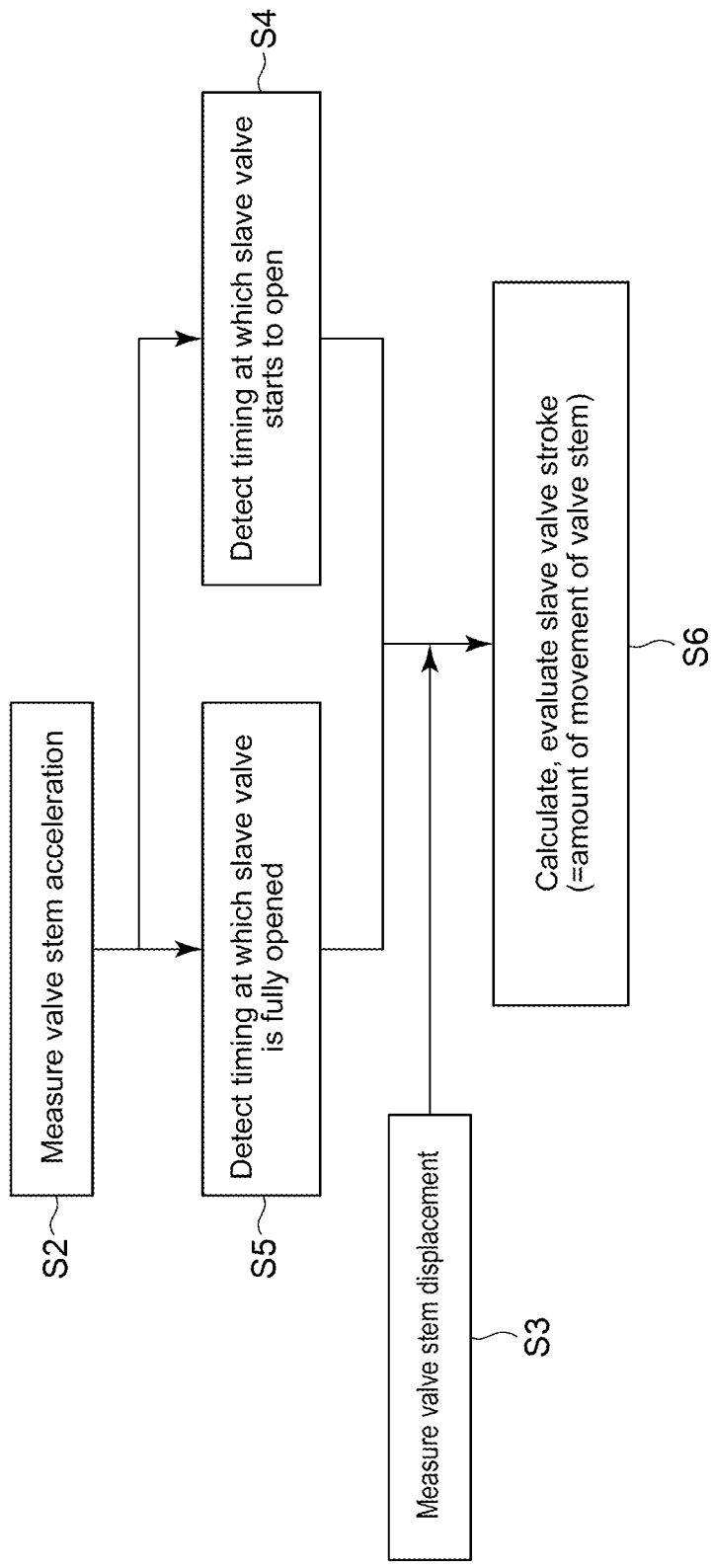
FIG. 9 is a flowchart showing a processing procedure in the measurement method for the steam valve according to the second embodiment.

FIG. 9 is a flowchart showing a processing procedure in the measurement method for the steam valve according to the second embodiment. The process shown in FIG. 9 is implemented by the processor 111 executing the programs stored in the memory 113.

The controller 110 starts the measurement of valve stem acceleration by the acceleration sensor 101 (step S2).

Further, the controller 110 starts the measurement of the distance to the displacement meter target 105a, that is, the amount of movement of the valve stem 61 by the displacement meter 105 (step S3).

The second detection unit 122 of the controller 110 detects the timing at which the slave valve 62 starts to open, based on the measurement result of the valve stem acceleration by the acceleration sensor 101 (step S4).

Figure 10A:
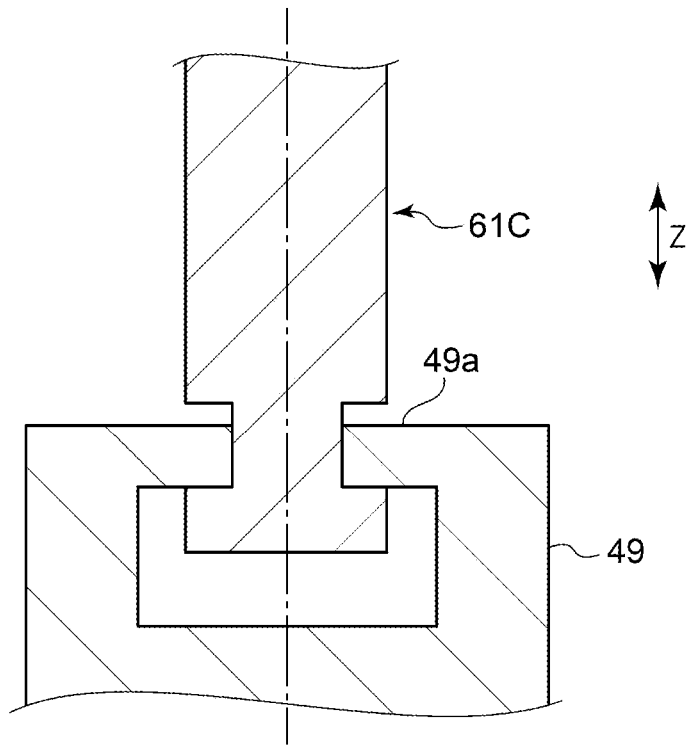
FIG. 10A is an enlarged view of a region B in FIG. 2.

FIG. 10A is an enlarged view of a region B in FIG. 2, and is a view showing the vicinity of the actuator crosshead 49 and the proximal end portion 61C of the valve stem 61 when the stop valve 45 is fully closed.

Figure 10B:
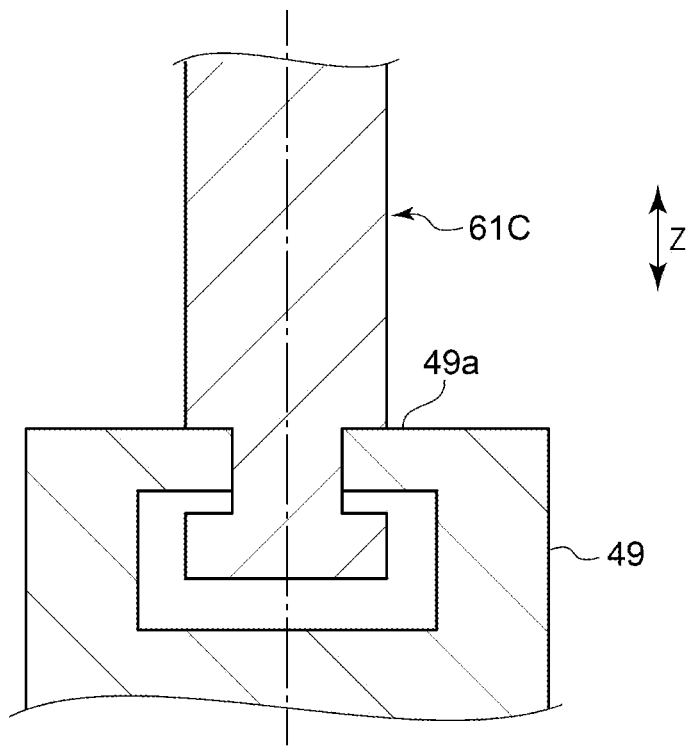
FIG. 10B is an enlarged view of the region B in FIG. 2.

FIG. 10B is an enlarged view of the region B in FIG. 2, and is a view showing the vicinity of the actuator crosshead 49 and the proximal end portion 61C of the valve stem 61 immediately after the actuator 46B starts to drive from when the stop valve 45 is fully closed.

As shown in FIGS. 10A and 10B, a slight gap exists in the axial direction Z in a fitting section between the proximal end portion 61C of the valve stem 61 and the actuator crosshead 49. Therefore, if the actuator 46B starts to drive from when the stop valve 45 is fully closed, a distal end side surface 49a of the actuator crosshead 49 collides with the proximal end portion 61C of the valve stem 61. At that time, the valve stem 61 receives an impact due to the collision. Consequently, a peak P2 appears on the graph line g2 representing the acceleration of the valve stem 61 in FIG. 6. The point where this peak P2 appears is the beginning of opening of the slave valve 62.

The first detection unit 121 of the controller 110 detects the timing at which the slave valve 62 is fully opened, based on the measurement result of the valve stem acceleration by the acceleration sensor 101 (step S5).

The calculation unit 123 of the controller 110 calculates a difference between a stroke amount (position) of the valve stem 61, which corresponds to the peak P2 on the graph line g2, and the stroke amount (position) of the valve stem 61, which corresponds to the peak P1 on the graph line g2, as the amount of movement of the valve stem (slave valve stroke) from the reference position (the position where the slave valve 62 starts to open) to the position where the slave valve 62 is fully opened.

The evaluation unit 124 of the controller 110 evaluates the amount of the wear on the steam valve 14 from the estimated slave valve stroke as described above (step S6).

Third Embodiment

Figure 11:
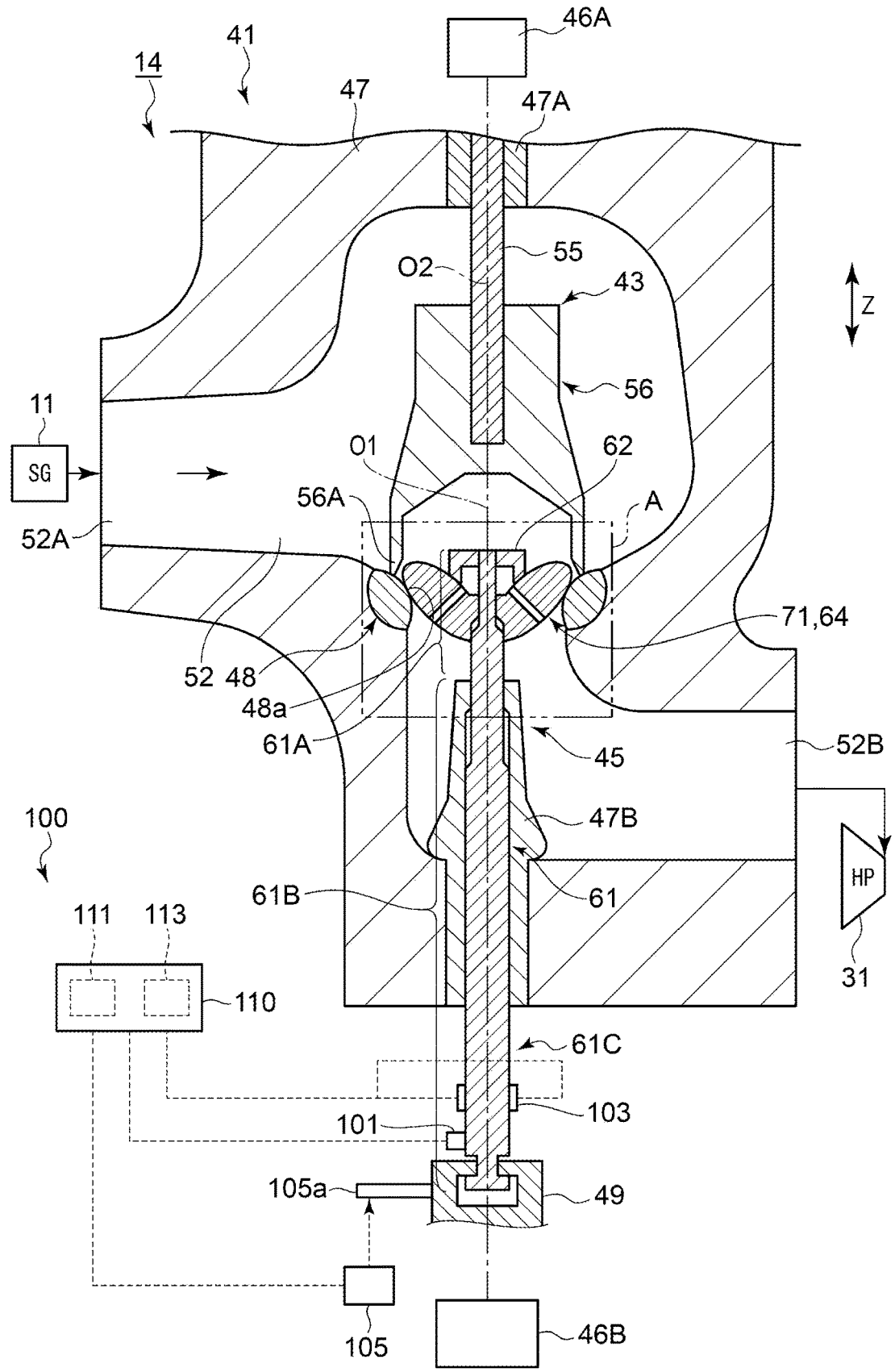
FIG. 11 is a diagram showing a device configuration for implementing the measurement method for the steam valve according to the third embodiment.

FIG. 11 is a diagram showing a device configuration for implementing the measurement method for the steam valve according to the third embodiment.

The measurement device 100 for the steam valve according to the third embodiment includes the acceleration sensor 101, the strain sensor 103, and the controller 110.

In the following description, the same components as those of the measurement device 100 for the steam valve according to the first embodiment are given the same reference signs as those of the measurement device 100 for the steam valve according to the first embodiment, and detailed descriptions thereof may be omitted.

In the measurement method for the steam valve according to the third embodiment, the reference position of the valve stem 61 is the position of the valve stem 61 at the beginning of opening of the slave valve 62, where the contact portion 621 of the slave valve 62 and the valve seat surface 48a of the valve seat 48 start to separate when the slave valve 62 is opened.

In the measurement method for the steam valve according to the third embodiment, the timing at which the slave valve 62 starts to open is detected from the measurement result of the strain on the valve stem 61, as in the first embodiment.

In the measurement method for the steam valve according to the third embodiment, the timing at which the slave valve 62 is fully opened is detected from the measurement result of the acceleration of the valve stem 61, as in the first embodiment.

In the measurement method for the steam valve according to the third embodiment, the amount of movement of the valve stem 61 is not measured by the displacement meter 105, but the amount of movement of the valve stem 61 is calculated from valve opening speed information (a moving speed of the valve stem 61) acquired in advance and an elapsed time. That is, in the measurement method for the steam valve according to the third embodiment, for example, the amount of movement of the valve stem 61 is calculated based on the valve opening speed information acquired in advance, such as the moving speed of the valve stem 61 obtained through actual measurement in advance, the moving speed of the valve stem 61 obtained in advance based on the driving speed of the actuator 46B estimated from the specifications of the actuator 46B and the amount of pressure oil supplied to the actuator 46B, or the like.

Figure 12:
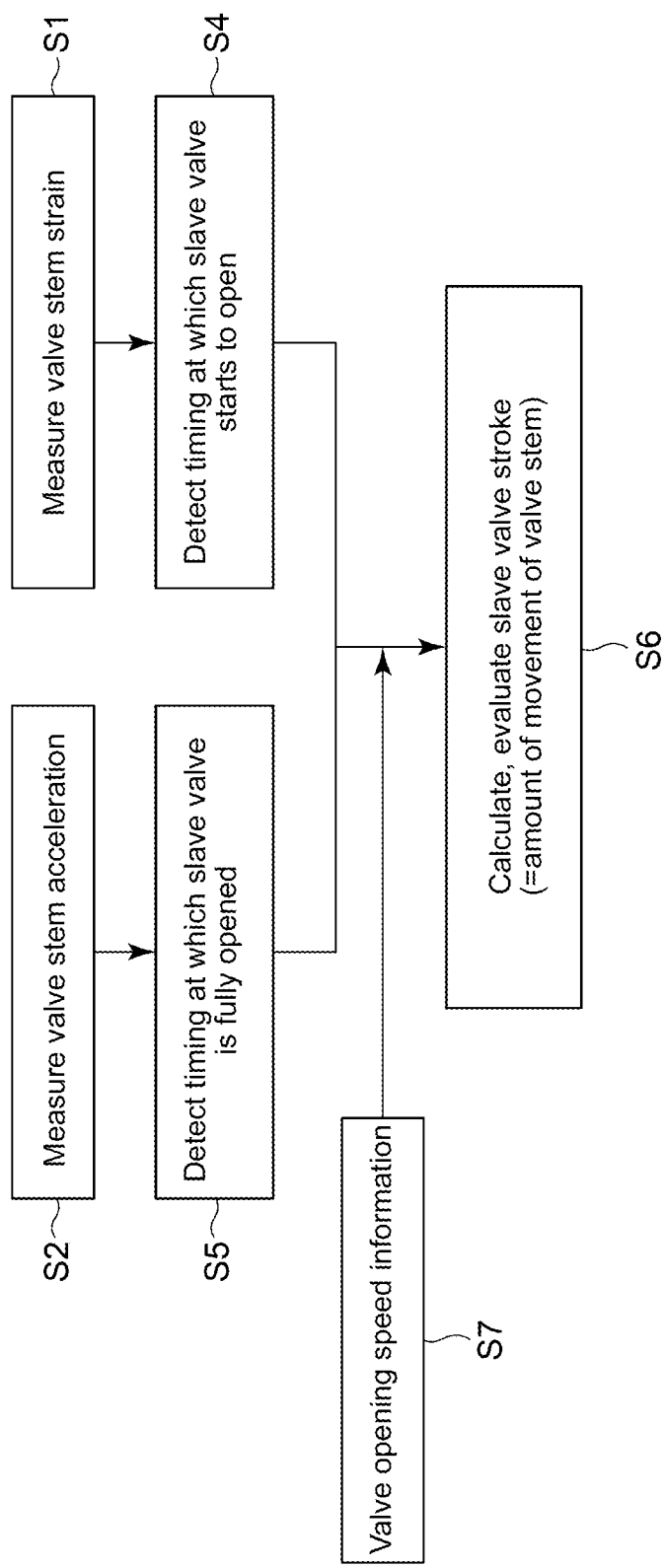
FIG. 12 is a flowchart showing a processing procedure in the measurement method for the steam valve according to the third embodiment.

FIG. 12 is a flowchart showing a processing procedure in the measurement method for the steam valve according to the third embodiment. The process shown in FIG. 12 is implemented by the processor 111 executing the programs stored in the memory 113.

The controller 110 starts the measurement of valve stem strain by the strain sensor 103 (step S1) and starts the measurement of valve stem acceleration by the acceleration sensor 101 (step S2).

Further, the controller 110 reads the valve opening speed information stored in the memory 113 and measures the elapsed time from the start of driving by the actuator 46B, for example (step S7).

The second detection unit 122 of the controller 110 detects the timing at which the slave valve 62 starts to open, based on the measurement result of the valve stem strain by the displacement meter 105 (step S4).

The first detection unit 121 of the controller 110 detects the timing at which the slave valve 62 is fully opened, based on the measurement result of the valve stem acceleration by the acceleration sensor 101 (step S5).

The calculation unit 123 of the controller 110 calculates the stroke amount (position) of the valve stem 61, which corresponds to the point S1 on the graph line g1 representing the strain on the valve stem 61 in FIG. 6, from the valve opening speed information acquired in advance and the elapsed time from the start of driving by the actuator 46B to the detection of the point S1 on graph line g1.

The calculation unit 123 of the controller 110 calculates the stroke amount (position) of the valve stem 61, which corresponds to the peak P1 on the graph line g2 representing the acceleration of the valve stem 61 in FIG. 6, from the valve opening speed information acquired in advance and the elapsed time from the start of driving by the actuator 46B to the detection of the peak P1 on the graph line g2.

Then, the calculation unit 123 of the controller 110 calculates the difference between the stroke amount (position) of the valve stem 61, which corresponds to the point S1 on the graph line g1, and the stroke amount (position) of the valve stem 61, which corresponds to the peak P1 on the graph line g2, as the amount of movement of the valve stem (slave valve stroke) from the reference position (the position where the slave valve 62 starts to open) to the position where the slave valve 62 is fully opened.

The evaluation unit 124 of the controller 110 evaluates the amount of the wear on the steam valve 14 from the estimated slave valve stroke as described above (step S6).

Fourth Embodiment

Figure 13:
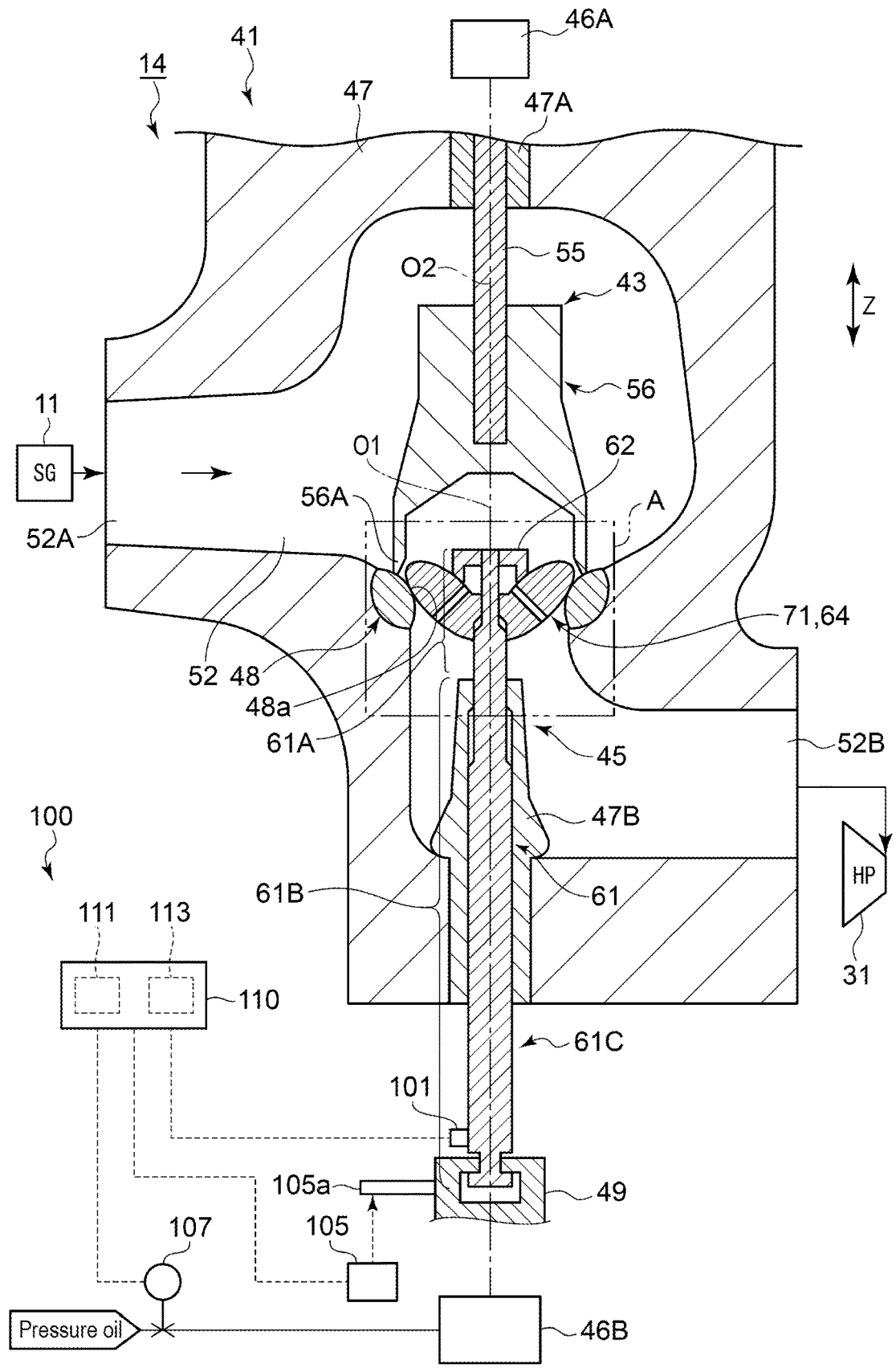
FIG. 13 is a diagram showing a device configuration for implementing the measurement method for the steam valve according to the fourth embodiment.

FIG. 13 is a diagram showing a device configuration for implementing the measurement method for the steam valve according to the fourth embodiment.

The measurement device 100 for the steam valve according to the first embodiment includes the acceleration sensor 101, the strain sensor 103, a pressure sensor 107, and the controller 110.

The pressure sensor 107 is a pressure sensor for measuring the pressure of pressure oil supplied to the actuator 46B (actuator oil pressure).

In the following description, the same components as those of the measurement device 100 for the steam valve according to the first embodiment are given the same reference signs as those of the measurement device 100 for the steam valve according to the first embodiment, and detailed descriptions thereof may be omitted.

In the measurement method for the steam valve according to the fourth embodiment, the reference position of the valve stem 61 is the position of the valve stem 61 at the beginning of opening of the slave valve 62, where the contact portion 621 of the slave valve 62 and the valve seat surface 48a of the valve seat 48 start to separate when the slave valve 62 is opened.

In the measurement method for the steam valve according to the first embodiment, the timing at which the slave valve 62 starts to open is detected not from the measurement result of the strain on the valve stem 61 but from the pressure of pressure oil supplied to the actuator 46B (actuator oil pressure).

In the measurement method for the steam valve according to the first embodiment, the timing at which the slave valve 62 is fully opened is detected from the measurement result of the acceleration of the valve stem 61.

In the measurement method for the steam valve according to the first embodiment, the amount of movement of the valve stem 61 is measured by the displacement meter 105.

Figure 14:
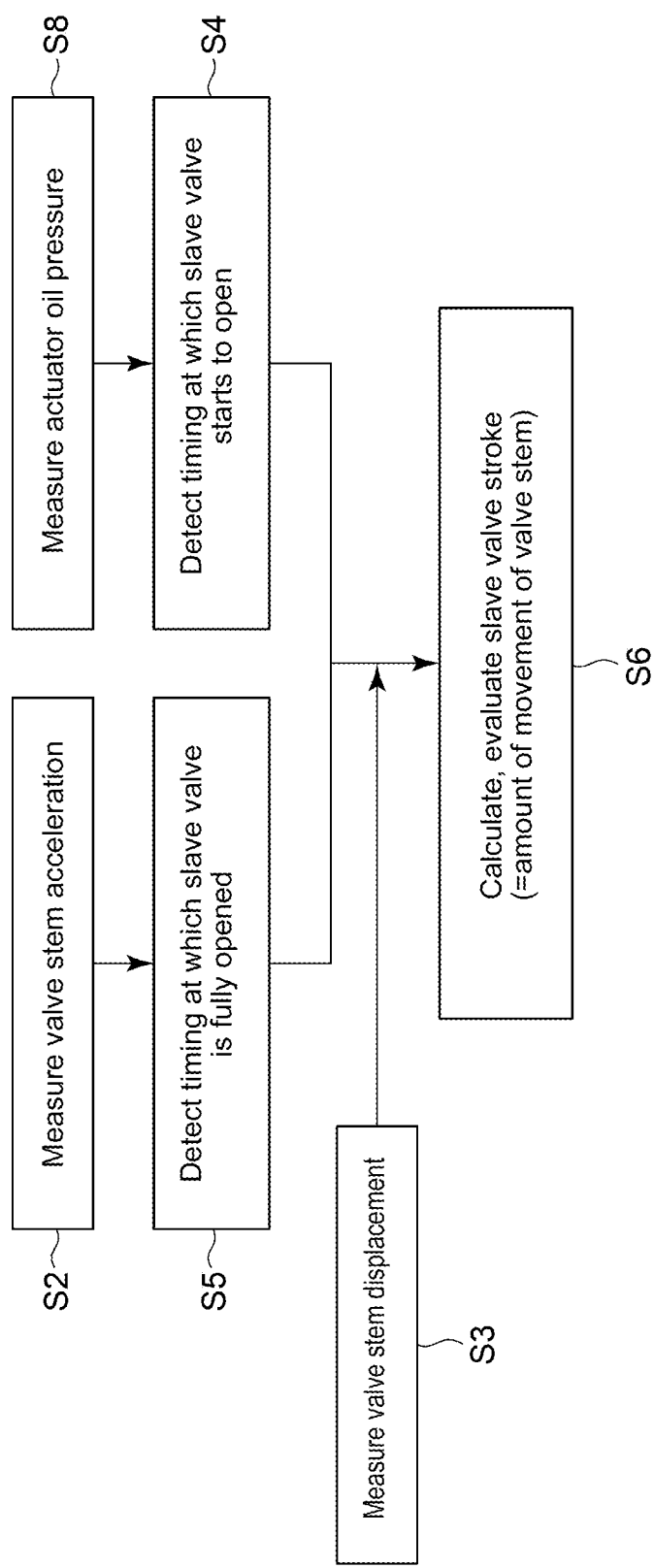
FIG. 14 is a flowchart showing a processing procedure in the measurement method for the steam valve according to the fourth embodiment.

FIG. 14 is a flowchart showing a processing procedure in the measurement method for the steam valve according to the fourth embodiment. The process shown in FIG. 14 is implemented by the processor 111 executing the programs stored in the memory 113.

The controller 110 starts the measurement of the actuator oil pressure by the pressure sensor 107 (step S8) and starts the measurement of valve stem acceleration by the acceleration sensor 101 (step S2).

Further, the controller 110 starts the measurement of the distance to the displacement meter target 105a, that is, the amount of movement of the valve stem 61 by the displacement meter 105 (step S3).

The second detection unit 122 of the controller 110 detects the timing at which the slave valve 62 starts to open, based on the measurement result of the actuator oil pressure by the pressure sensor 107 (step S4).

Immediately before the slave valve 62 starts to open, the slave valve 62 is to be opened against the pressure of the high-pressure steam acting on the slave valve 62, and thus the actuator oil pressure rises.

When the slave valve 62 starts to open, the high-pressure steam flows into the inlet 71Ba of the through hole 71B from the gap between the valve seat surface 71a and the contact portion 621 and is led out to the steam flow path 52 from the outlet 71Bb of the through hole 71B as described above, decreasing the pressure of the steam acting on the slave valve 62. Consequently, the actuator oil pressure gradually decreases. That is, the actuator oil pressure shows a pressure change which is similar to the graph line g1 representing the strain on the valve stem 61 in FIG. 6.

Therefore, by using the measurement result of the actuator oil pressure, as the point S1 on the graph line g1 representing the strain on the valve stem 61 in FIG. 6, the point where the actuator oil pressure suddenly starts to decrease is the beginning of opening of the slave valve 62.

The first detection unit 121 of the controller 110 detects the timing at which the slave valve 62 is fully opened, based on the measurement result of the valve stem acceleration by the acceleration sensor 101 (step S5).

The calculation unit 123 of the controller 110 calculates a difference between the stroke amount (position) of the valve stem 61, which corresponds to the above-described point where the actuator oil pressure suddenly starts to decrease, and the stroke amount (position) of the valve stem 61, which corresponds to the peak P1 on the graph line g2 representing the acceleration of the valve stem 61 in FIG. 6, as the amount of movement of the valve stem (slave valve stroke) from the reference position (the position where the slave valve 62 starts to open) to the position where the slave valve 62 is fully opened.

The evaluation unit 124 of the controller 110 evaluates the amount of the wear on the steam valve 14 from the estimated slave valve stroke as described above (step S6).

As described above, the measurement method for the steam valve according to some embodiments includes: step S2 of measuring the acceleration of the valve stem 61 when the slave valve 62 is opened by driving the valve stem 61 with the actuator 46B from the fully closed state of the master valve 64 and the slave valve 62; step S5 of detecting the timing at which the slave valve 62 is fully opened, based on the measured acceleration of the valve stem 61; and step S6 of calculating the amount of movement of the valve stem from the reference position to the position where the slave valve 62 is fully opened.

In the measurement method for the steam valve according to some embodiments, by detecting the acceleration of the valve stem 61, it is possible to detect the timing at which the slave valve 62 is fully opened, without disassembling the steam valve 14, while continuing the operation of the steam turbine 10. Further, in the measurement method for the steam valve according to some embodiments, the timing at which the slave valve 62 is fully opened can accurately be detected by detecting the acceleration of the valve stem 61. Whereby, the accuracy of calculating the amount of movement of the valve stem 61 from the reference position to the position where the slave valve 62 is fully opened is improved, and the accuracy of measuring the wear on the steam valve 14 is improved.

The measurement device 100 for the steam valve according to some embodiments includes: the acceleration sensor 101 for measuring the acceleration of the valve stem 61; the first detection unit 121 for detecting the timing at which the slave valve 62 is fully opened, based on the acceleration of the valve stem 61 measured by the acceleration sensor 101; and the calculation unit 123 for calculating the amount of movement of the valve stem 61 from the reference position to the position where the slave valve 62 is fully opened.

In the measurement device 100 for the steam valve according to some embodiments, by measuring the acceleration of the valve stem 61, it is possible to detect the timing at which the slave valve 62 is fully opened, without disassembling the steam valve 14, while continuing the operation of the steam turbine 10. Further, in the measurement device 100 for the steam valve according to some embodiments, the timing at which the slave valve 62 is fully opened can accurately be detected by measuring the acceleration of the valve stem 61. Whereby, the accuracy of calculating the amount of movement of the valve stem 61 from the reference position to the position where the slave valve 62 is fully opened is improved, and the accuracy of measuring the wear on the steam valve 14 is improved.

In the measurement method for the steam valve according to some embodiments, the above-described reference position is the position of the valve stem 61 when the slave valve 62 starts to open.

Likewise, the measurement device 100 for the steam valve according to some embodiments includes the second detection unit 122 for detecting the timing at which the slave valve 62 starts to open. The calculation unit 123 calculates the amount of movement of the valve stem 61 from the reference position to the position where the slave valve 62 is fully opened, with the timing when the slave valve 62 starts to open, which is detected by the second detection unit 122, being as the reference position.

By setting the reference position to the position of the valve stem 61 when the slave valve 62 starts to open, it is possible to relatively accurately specify the reference position which is referred to in calculating the amount of movement of the valve stem 61 from the reference position to the position where the slave valve 62 is fully opened, improving the accuracy of the amount of movement of the valve stem 61 from the calculated reference position to the position where the slave valve 62 is fully opened.

The measurement method for the steam valve according to some embodiments shown in FIGS. 5 and 12 includes: step S1 of measuring the strain on the valve stem 61 when the slave valve 62 is opened by driving the valve stem 61 with the actuator 46B from the fully closed state of the master valve 64 and the slave valve 62; and step S4 of detecting the timing at which the slave valve 62 starts to open, based on the measured strain on the valve stem 61.

Since a relatively large force is required to open the slave valve 62, the strain on the valve stem 61 when the slave valve 62 is opened can be measured relatively easily. Therefore, the timing at which the slave valve 62 starts to open is detected easily. Further, the accuracy of detecting the timing at which the slave valve 62 starts to open can be improved by measuring the strain on the valve stem 61 when the slave valve 62 is opened.

The measurement method for the steam valve shown in FIG. 9 includes step S4 of detecting the timing at which the slave valve 62 starts to open, based on the measured acceleration of the valve stem 61.

In the measurement method for the steam valve shown in FIG. 9, for example, since it is possible to detect the timing at which the slave valve 62 starts to open and the timing at which the slave valve 62 is fully opened, based on the measurement result of the same acceleration sensor 101, it is possible to simplify the device configuration for detecting these timings. In the measurement method for the steam valve shown in FIG. 9, it is possible to omit the trouble of measuring the strain on the valve stem 61, compared to a case where the timing at which the slave valve 62 starts to open is detected based on the strain, for example.

The measurement method for the steam valve shown in FIG. 14 includes: step S8 of measuring the pressure of the pressure oil supplied to the actuator 46B when the slave valve 62 is opened by driving the valve stem with the actuator 46B from the fully closed state of the master valve 64 and the slave valve 62; and step S4 of detecting the timing at which the slave valve 62 starts to open, based on the measured pressure of the pressure oil.

In the measurement method for the steam valve shown in FIG. 14, since the pressure of the pressure oil, which is supplied to the actuator 46B serving as the hydraulic actuator, is measured relatively easily, it is possible to relatively easily detect the timing at which the slave valve 62 starts to open. Further, in the measurement method for the steam valve shown in FIG. 14, it is possible to omit the trouble of measuring the strain on the valve stem 61, compared to the case where the timing at which the slave valve 62 starts to open is detected based on the strain, for example.

In the measurement method for the steam valve according to some embodiments, the above-described reference position may not be the position of the valve stem 61 when the slave valve 62 starts to open, but may be, for example, a position of the valve stem 61 when the master valve 64 and the slave valve 62 are in the fully closed state.

Whereby, the reference position is easily set and detected.

In the measurement method for the steam valve according to some embodiments shown in FIGS. 5, 9, and 14, step S6 of calculating the amount of movement of the valve stem 61 includes calculating the amount of movement of the valve stem 61 from the reference position to the position where the slave valve 62 is fully opened, based on a change in position of the valve stem 61 detected by the displacement meter 105.

Whereby, the accuracy of detecting the position of the valve stem 61 is relatively increased, making it possible to improve the accuracy of calculating the amount of movement of the valve stem 61 from the reference position to the position where the slave valve 62 is fully opened.

In the measurement method for the steam valve shown in FIG. 12, step S6 of calculating the amount of movement of the valve stem 61 includes calculating the amount of movement of the valve stem 61 from the reference position to the position where the slave valve 62 is fully opened, based on the known moving speed information (valve opening speed information) of the valve stem 61.

Thus, it is possible to omit the displacement meter 105 for detecting the position of the valve stem 61.

The present disclosure is not limited to the above-described embodiments, and also includes an embodiment obtained by modifying the above-described embodiments or an embodiment obtained by combining these embodiments as appropriate.

For example, in the measurement method for the steam valve according to some embodiments described above, the respective steps shown in FIGS. 5, 9, 12, and 14 are performed by the processor 111 executing the programs stored in the memory 113. However, in the measurement method for the steam valve according to some embodiments, at least some of the respective steps shown in FIGS. 5, 9, 12, and 14 may be performed by a worker.

The contents described in the above embodiments would be understood as follows, for instance.

(1) A measurement method for a steam valve according at least one embodiment of the present disclosure is a measurement method for a steam valve 14 including: a valve body 41 that includes a steam flow path 52 through which steam flows, and a valve seat 48 disposed in the middle of the steam flow path 52 and having an opening portion; a stop valve 45 that includes a valve stem 61 which extends in an axial direction Z where an axis O1, O2 extends and is movable back and forth in the axial direction Z, a slave valve 62 disposed at a distal end of the valve stem 61 in a distal end portion 61A of the valve stem 61, and a master valve 64 which includes a penetrating portion 71A where a part, of the distal end portion 61A of the valve stem 61, located closer to a proximal end side of the valve stem 61 than the distal end is inserted, closes the steam flow path 52 by being brought into contact with the valve seat 48, and is formed with a through hole 71B where steam flows in when the slave valve 62 is opened; and an actuator 46B for driving the valve stem 61. The measurement method for the steam valve according at least one embodiment of the present disclosure, includes: a step S2 of measuring acceleration of the valve stem 61 when the slave valve 62 is opened by driving the valve stem 61 with the actuator 46B from a fully closed state of the master valve 64 and the slave valve 62; a step S5 of detecting a timing at which the slave valve 62 is fully opened, based on the measured acceleration of the valve stem 61; and a step S6 of calculating an amount of movement of the valve stem 61 from a reference position to a position where the slave valve 62 is fully opened.

With the above method (1), by detecting the acceleration of the valve stem 61, it is possible to detect the timing at which the slave valve 62 is fully opened, without disassembling the steam valve 14, while continuing the operation of the steam turbine 10. Further, with the above method (1), the timing at which the slave valve 62 is fully opened can accurately be detected by detecting the acceleration of the valve stem 61. Whereby, the accuracy of calculating the amount of movement of the valve stem 61 from the reference position to the position where the slave valve 62 is fully opened is improved, and the accuracy of measuring the wear on the steam valve 14 is improved.

(2) In some embodiments, in the above method (1), the reference position is preferably a position of the valve stem 61 when the slave valve 62 starts to open.

With the above method (2), by setting the reference position to the position of the valve stem 61 when the slave valve 62 starts to open, it is possible to relatively accurately specify the reference position which is referred to in calculating the amount of movement of the valve stem 61 from the reference position to the position where the slave valve 62 is fully opened, improving the accuracy of the amount of movement of the valve stem 61 from the calculated reference position to the position where the slave valve 62 is fully opened.

(3) In some embodiments, in the above method (2), the measurement method for the steam valve, preferably includes: a step S1 of measuring a strain on the valve stem 61 when the slave valve 62 is opened by driving the valve stem 61 with the actuator 46B from the fully closed state of the master valve 64 and the slave valve 62; and a step S4 of detecting a timing at which the slave valve 62 starts to open, based on the measured strain on the valve stem 61.

With the above method (3), since a relatively large force is required to open the slave valve 62, the strain on the valve stem 61 when the slave valve 62 is opened can be measured relatively easily. Therefore, the timing at which the slave valve 62 starts to open is detected easily. Further, the accuracy of detecting the timing at which the slave valve 62 starts to open can be improved by measuring the strain on the valve stem 61 when the slave valve 62 is opened.

(4) In some embodiments, in the above method (2), the measurement method for the steam valve, preferably includes: a step S4 of detecting a timing at which the slave valve 62 starts to open, based on the measured acceleration of the valve stem 61.

With the above method (4), for example, since it is possible to detect the timing at which the slave valve 62 starts to open and the timing at which the slave valve 62 is fully opened, based on the measurement result of the same acceleration sensor 101, it is possible to simplify the device configuration for detecting these timings. With the above method (4), it is possible to omit the trouble of measuring the strain on the valve stem 61, compared to the case where the timing at which the slave valve 62 starts to open is detected based on the strain, for example.

(5) In some embodiments, in the above method (2), the actuator 46B is preferably a hydraulic actuator. The measurement method for the steam valve, may include: a step S8 of measuring a pressure of pressure oil supplied to the hydraulic actuator (actuator 46B) when the slave valve 62 is opened by driving the valve stem 61 with the actuator 46B from the fully closed state of the master valve 64 and the slave valve 62; and a step S4 of detecting a timing at which the slave valve 62 starts to open, based on the measured pressure of the pressure oil.

With the above method (5), since the pressure of the pressure oil, which is supplied to the hydraulic actuator (actuator 46B), is measured relatively easily, it is possible to relatively easily detect the timing at which the slave valve 62 starts to open. Further, with the above method (5), it is possible to omit the trouble of measuring the strain on the valve stem 61, compared to the case where the timing at which the slave valve 62 starts to open is detected based on the strain, for example.

(6) In some embodiments, in the above method (1), the reference position may be a position of the valve stem 61 when the master valve 64 and the slave valve 62 are in the fully closed state.

With the above method (6), the reference position is easily set and detected.

(7) In some embodiments, in any of the above methods (1) to (6), the step S6 of calculating the amount of movement of the valve stem 61 preferably includes calculating the amount of movement of the valve stem 61 from the reference position to the position where the slave valve 62 is fully opened, based on a change in the position of the valve stem 61, which is detected by a displacement meter 105.

With the above method (7), the accuracy of detecting the position of the valve stem 61 is relatively increased, making it possible to improve the accuracy of calculating the amount of movement of the valve stem 61 from the reference position to the position where the slave valve 62 is fully opened.

(8) In some embodiments, in any of the above methods (1) to (6), the step S8 of calculating the amount of movement of the valve stem 61 may include calculating the amount of movement of the valve stem 61 from the reference position to the position where the slave valve 62 is fully opened, based on known moving speed information (valve opening speed information) of the valve stem 61.

With the above method (8), it is possible to omit the displacement meter 105 for detecting the position of the valve stem 61.

(9) A measurement device 100 for a steam valve according at least one embodiment of the present disclosure is a measurement device for a steam valve 14 including: a valve body 41 that includes a steam flow path 52 through which steam flows, and a valve seat 48 disposed in the middle of the steam flow path 52 and having an opening portion; a stop valve 45 that includes a valve stem 61 which extends in an axial direction Z where an axis O1, O2 extends and is movable back and forth in the axial direction Z, a slave valve 62 disposed at a distal end of the valve stem 61 in a distal end portion 61A of the valve stem 61, and a master valve 64 which includes a penetrating portion 71A where a part, of the distal end portion 61A of the valve stem 61, located closer to a proximal end side of the valve stem 61 than the distal end is inserted, closes the steam flow path 52 by being brought into contact with the valve seat 48, and is formed with a through hole 71B where steam flows in when the slave valve 62 is opened; and an actuator 46B for driving the valve stem 61. The measurement device 100 for the steam valve according to at least one embodiment of the present disclosure includes: an acceleration sensor 101 for measuring acceleration of the valve stem 61; a first detection unit 121 for detecting a timing at which the slave valve 62 is fully opened, based on the acceleration of the valve stem 61 measured by the acceleration sensor 101; and a calculation unit 123 for calculating an amount of movement of the valve stem 61 from a reference position to a position where the slave valve 62 is fully opened.

With the above configuration (9), by detecting the acceleration of the valve stem 61, it is possible to detect the timing at which the slave valve 62 is fully opened, without disassembling the steam valve 14, while continuing the operation of the steam turbine 10. Further, with the above configuration (9), the timing at which the slave valve 62 is fully opened can accurately be detected by detecting the acceleration of the valve stem 61. Whereby, the accuracy of calculating the amount of movement of the valve stem 61 from the reference position to the position where the slave valve 62 is fully opened is improved, and the accuracy of measuring the wear on the steam valve 14 is improved.

(10) In some embodiments, in the above configuration (9), the measurement device for the steam valve, preferably includes: a second detection unit 122 for detecting a timing at which the slave valve 62 starts to open. The calculation unit 123 is preferably configured to calculate the amount of movement of the valve stem 61 from the reference position to the position where the slave valve 62 is fully opened, with the timing at which the slave valve 62 starts to open, which is detected by the second detection unit 122, being as the reference position.

With the above configuration (10), by setting the reference position to the position of the valve stem 61 when the slave valve 62 starts to open, it is possible to relatively accurately specify the reference position which is referred to in calculating the amount of movement of the valve stem 61 from the reference position to the position where the slave valve 62 is fully opened, improving the accuracy of the amount of movement of the valve stem 61 from the calculated reference position to the position where the slave valve 62 is fully opened.

REFERENCE SIGNS LIST

10 Steam turbine
11 Boiler
14 Steam valve
41 Valve body
43 Control valve
45 Stop valve
46A, 46B Actuator
48 Valve seat
52 Steam flow path
61 Valve stem
61A Distal end portion
62 Slave valve
64 Master valve
71A Penetrating portion
71B Through hole
100 Measurement device
101 Acceleration sensor
103 Strain sensor
105 Displacement meter
110 Controller
121 First detection unit
122 Second detection unit
123 Calculation unit
124 Evaluation unit

The invention claimed is:

1. A measurement method for a steam valve including:
a valve body that includes a steam flow path through which steam flows, and a valve seat disposed in the middle of the steam flow path and having an opening portion;
a stop valve that includes a valve stem which extends in an axial direction where an axis extends and is movable back and forth in the axial direction, a slave valve disposed at a distal end of the valve stem in a distal end portion of the valve stem, and a master valve which includes a penetrating portion where a part, of the distal end portion of the valve stem, located closer to a proximal end side of the valve stem than the distal end is inserted, closes the steam flow path by being brought into contact with the valve seat, and is formed with a through hole where steam flows in when the slave valve is opened; and
an actuator for driving the valve stem,
the measurement method for the steam valve, comprising:
a step of measuring acceleration of the valve stem when the slave valve is opened by driving the valve stem with the actuator from a fully closed state of the master valve and the slave valve;
a step of detecting a timing at which the slave valve is fully opened, based on the measured acceleration of the valve stem; and
a step of calculating an amount of movement of the valve stem from a reference position to a position where the slave valve is fully opened.

2. The measurement method for the steam valve according to claim 1,
wherein the reference position is a position of the valve stem when the slave valve starts to open.

3. The measurement method for the steam valve according to claim 2, comprising:
a step of measuring a strain on the valve stem when the slave valve is opened by driving the valve stem with the actuator from the fully closed state of the master valve and the slave valve; and
a step of detecting a timing at which the slave valve starts to open, based on the measured strain on the valve stem.

4. The measurement method for the steam valve according to claim 2, comprising:
a step of detecting a timing at which the slave valve starts to open, based on the measured acceleration of the valve stem.

5. The measurement method for the steam valve according to claim 2,
wherein the actuator is a hydraulic actuator, and
wherein the measurement method for the steam valve, comprises:
a step of measuring a pressure of pressure oil supplied to the hydraulic actuator when the slave valve is opened by driving the valve stem with the actuator from the fully closed state of the master valve and the slave valve; and
a step of detecting a timing at which the slave valve starts to open, based on the measured pressure of the pressure oil.

6. The measurement method for the steam valve according to claim 1,
wherein the reference position is a position of the valve stem when the master valve and the slave valve are in the fully closed state.

7. The measurement method for the steam valve according to claim 1,
wherein the step of calculating the amount of movement of the valve stem includes calculating the amount of movement of the valve stem from the reference position to the position where the slave valve is fully opened, based on a change in the position of the valve stem, which is detected by a displacement meter.

8. The measurement method for the steam valve according to claim 1,
wherein the step of calculating the amount of movement of the valve stem includes calculating the amount of movement of the valve stem from the reference position to the position where the slave valve is fully opened, based on known moving speed information of the valve stem.

9. A measurement device for a steam valve including:
a valve body that includes a steam flow path through which steam flows, and a valve seat disposed in the middle of the steam flow path and having an opening portion;
a stop valve that includes a valve stem which extends in an axial direction where an axis extends and is movable back and forth in the axial direction, a slave valve disposed at a distal end of the valve stem in a distal end portion of the valve stem, and a master valve which includes a penetrating portion where a part, of the distal end portion of the valve stem, located closer to a proximal end side of the valve stem than the distal end is inserted, closes the steam flow path by being brought into contact with the valve seat, and is formed with a through hole where steam flows in when the slave valve is opened; and
an actuator for driving the valve stem, the measurement device for the steam valve, comprising:

an acceleration sensor for measuring acceleration of the valve stem;

a first detection unit for detecting a timing at which the slave valve is fully opened, based on the acceleration of the valve stem measured by the acceleration sensor; and a calculation unit for calculating an amount of movement of the valve stem from a reference position to a position where the slave valve is fully opened.

10. The measurement device for the steam valve according to claim 9, comprising:

a second detection unit for detecting a timing at which the slave valve starts to open, wherein the calculation unit is configured to calculate the amount of movement, with the timing at which the slave valve starts to open, which is detected by the second detection unit, being as the reference position.

* * * * *